United States Patent
Kim et al.

(10) Patent No.: US 10,619,282 B2
(45) Date of Patent: Apr. 14, 2020

(54) WASHING MACHINE AND CONTROL METHOD FOR SAME

(71) Applicant: Samsung Electronics Co., Ltd, Gyeonggi-do (KR)

(72) Inventors: Hyun Sook Kim, Gyeonggi-do (KR); Eun Suk Bang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 14/917,250

(22) PCT Filed: Sep. 4, 2014

(86) PCT No.: PCT/KR2014/008318
§ 371 (c)(1),
(2) Date: Mar. 7, 2016

(87) PCT Pub. No.: WO2015/034284
PCT Pub. Date: Mar. 12, 2015

(65) Prior Publication Data
US 2016/0201248 A1    Jul. 14, 2016

(30) Foreign Application Priority Data

Sep. 5, 2013  (KR) .................. 10-2013-0106432
Feb. 11, 2014  (KR) .................. 10-2014-0015762

(51) Int. Cl.
*D06F 39/08* (2006.01)
*D06F 33/02* (2006.01)
(Continued)

(52) U.S. Cl.
CPC ............. *D06F 33/02* (2013.01); *D06F 39/02* (2013.01); *D06F 39/087* (2013.01); *G06F 3/041* (2013.01);
(Continued)

(58) Field of Classification Search
CPC ...... D06F 39/02; D06F 39/028; D06F 39/005; D06F 2058/2803; D06F 2216/00;
(Continued)

(56) References Cited

U.S. PATENT DOCUMENTS 6,301,733 B1    10/2001  Dawson et al.
7,784,133 B2    8/2010   Bang et al.
(Continued)

FOREIGN PATENT DOCUMENTS

CN    1254391 A    5/2000
CN    1509357 A    6/2004
(Continued)

OTHER PUBLICATIONS

Office Action dated Sep. 20, 2017 in connection with Chinese Patent Application No. 201480049281.8.
(Continued)

*Primary Examiner* — Joseph L. Perrin
*Assistant Examiner* — Irina Graf

(57) ABSTRACT

A washing machine may include a drum that is rotatably provided inside a tub, a first water supply unit that directly jets water into the drum, a second water supply unit that supplies water to the tub via an automatic detergent supply unit, an input unit that receives selection of any one of detergent supply through the automatic detergent supply unit and detergent supply through a detergent container, and a control unit that jets water into the drum using the first water supply unit so that a detergent accommodated in the detergent container flows out, when the detergent supply through the detergent container is selected.

12 Claims, 28 Drawing Sheets

(51) Int. Cl.
*G06F 3/041* (2006.01)
*D06F 39/02* (2006.01)
*D06F 39/00* (2020.01)

(52) U.S. Cl.
CPC .......... *D06F 39/005* (2013.01); *D06F 39/088* (2013.01); *D06F 2204/08* (2013.01); *D06F 2216/00* (2013.01)

(58) Field of Classification Search
CPC ............... D06F 2214/00; D06F 39/088; D06F 2204/086; D06F 35/005
See application file for complete search history.

(56) References Cited

U.S. PATENT DOCUMENTS

| | | | |
|---|---|---|---|
| 9,080,274 B2 | 7/2015 | Kim et al. | |
| 2005/0217036 A1* | 10/2005 | Park | D06F 21/06 8/158 |
| 2006/0000030 A1* | 1/2006 | Shaffer | D06F 35/006 8/159 |
| 2010/0000023 A1* | 1/2010 | Mcallister | A47L 15/0055 8/137 |
| 2011/0099732 A1* | 5/2011 | Im | D06F 33/02 8/137 |
| 2011/0146004 A1* | 6/2011 | Kim | D06F 33/02 8/137 |
| 2012/0180533 A1 | 7/2012 | Song et al. | |
| 2012/0266389 A1* | 10/2012 | Ihne | D06F 39/02 8/137 |
| 2013/0290902 A1* | 10/2013 | Martin | D06F 39/005 715/823 |

FOREIGN PATENT DOCUMENTS

| | | |
|---|---|---|
| CN | 101126201 A | 2/2008 |
| CN | 201952642 U | 8/2011 |
| CN | 102199855 A | 9/2011 |
| CN | 102587088 A | 7/2012 |
| CN | 102762789 A | 10/2012 |
| EP | 2048276 A1 | 4/2009 |
| EP | 2196574 A1 | 6/2009 |
| EP | 2471993 A1 * | 7/2012 ............ D06F 33/02 |
| EP | 2602381 A2 | 6/2013 |
| EP | 2602381 A3 | 10/2013 |
| EP | 2692930 A1 | 2/2014 |
| GB | 2127045 A | 4/1984 |
| JP | 2011-200524 | 10/2011 |
| KR | 10-1041081 | 6/2011 |
| KR | 10-1114329 | 2/2012 |
| KR | 10-2012-0082989 | 7/2012 |
| KR | 10-1263315 | 5/2013 |
| WO | 2012092445 A2 | 7/2012 |
| WO | 2012132272 A1 | 10/2012 |

OTHER PUBLICATIONS

Foreign Communication From a Related Counterpart Application, European Application No. 14843131.5-1710, Extended European Search Report dated Jan. 27, 2017, 11 pages.

International Search Report dated Dec. 1, 2014 in connection with International Application No. PCT/KR2014/008318, 4 pages.

Written Opinion of the International Searching Authority dated Dec. 1, 2014 in connection with International Application No. PCT/KR2014/008318, 5 pages.

Office Action dated Feb. 17, 2017 in connection with Chinese Patent Application No. 201480049281.8.

Communication from a foreign patent office in a counterpart foreign application, State Intellectual Property Office of the Peoples Republic of China, "The Third Office Action," Application No. CN 201480049281.8, dated Apr. 16, 2018, 23 pages.

European Patent Office, "Communication pursuant to Article 94(3) EPC," Application No. EP14843131.5, dated Jan. 24, 2019, 6 pages.

China National Intellectual Property Administration, "The Fourth Office Action," Application No. CN201480049281.8, dated Nov. 5, 2018, 25 pages.

Office Action dated May 23, 2019 in connection with Chinese Patent Application No. 201480049281.8, 7 pages.

* cited by examiner (a)          (b)

FIG. 9a
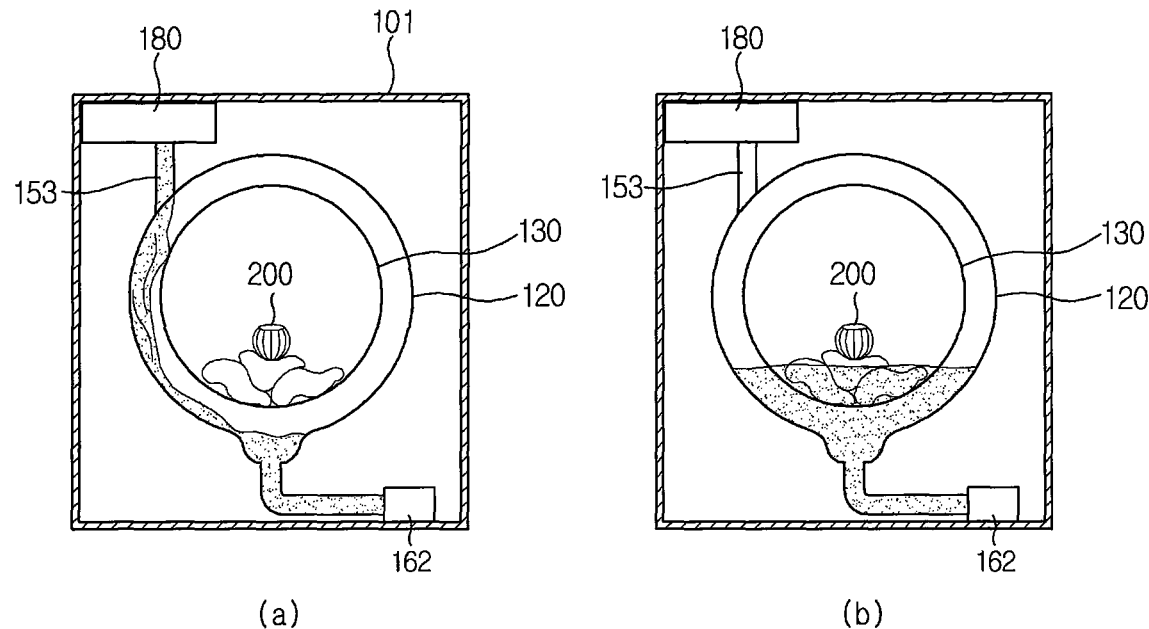
(a) (b)
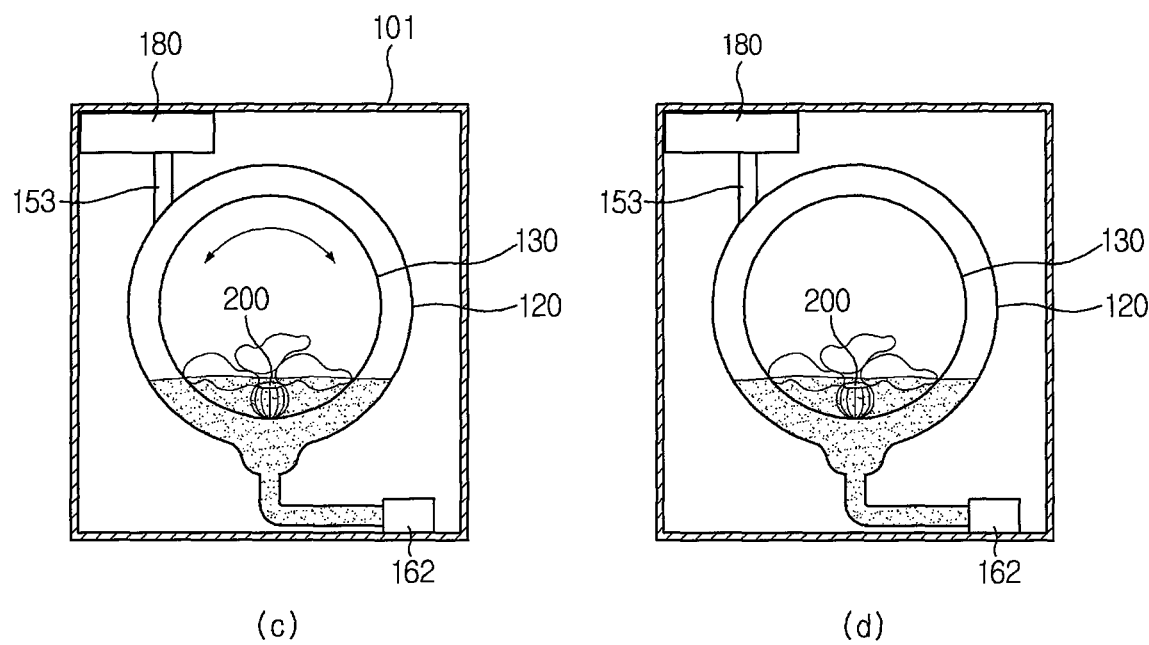
(c) (d)

WASHING MACHINE AND CONTROL
METHOD FOR SAME

CROSS-REFERENCE TO RELATED
APPLICATION(S)

The present application claims priority under 35 U.S.C. § 365 to International Patent Application No. PCT/KR2014/008318 filed Sep. 4, 2014, entitled "WASHING MACHINE AND CONTROL METHOD FOR SAME", and, through International Patent Application No. PCT/KR2014/007077, to Korean Patent Application No. 10-2013-0106432 filed Sep. 5, 2013 and Korean Patent Application No. 10-2014-0015762 filed Feb. 11, 2014, each of which are incorporated herein by reference into the present disclosure as if fully set forth herein.

TECHNICAL FIELD

Embodiments of the present invention relate to a washing machine, and more particularly, to a washing machine in which a user directly feeds a detergent into a drum.

BACKGROUND ART

In general, a washing machine is an apparatus including a tub that accommodates water and a drum that is rotatably installed inside the tub, and the drum rotates with laundry loaded inside the tub to wash the laundry.

A user may feed a detergent to a washing machine detergent container or use a detergent directly fed into the drum, but a conventional washing machine does not provide a function of setting a detergent use environment by the user or a function of varying operations of the washing machine in both cases in which the detergent is fed to the detergent container and the detergent is directly fed into the drum.

Meanwhile, the liquid detergent market has increased recently, and there is a trend that a washing machine equipped with an automatic detergent feeder that automatically feeds a detergent is being released in order to solve inconvenience in measuring the liquid detergent. Thus, a role of the detergent container is reduced. In addition, a user may use at least two kinds of detergents such as a delicate washing detergent, a general washing detergent, and the like in the home, and therefore there is inconvenience that the detergent container should be replaced when using the automatic detergent feeder.

DISCLOSURE

Technical Problem

Therefore, it is an aspect of the present invention to provide a washing machine that configures a user interface through which users can select a condition of directly feeding a detergent into a drum when using a separate detergent other than a detergent stored for automatic feeding of detergent, that is, when using a separate detergent feeding container through which a user can directly feed a detergent into the drum or when using a packed detergent that is dissolved in water together with a solid detergent or an outer packing material, and that is variably operated so that a corresponding detergent can be effectively dissolved when directly feeding the detergent into the drum together with laundry.

Technical Solution

In accordance with one aspect of the present invention, a washing machine includes a tub that accommodates water; a drum that is rotatably provided inside the tub; a first water supply unit that jets water into the drum; and a control unit that controls the first water supply unit so that water is jetted into the drum in which a detergent feeding container is fed when a washing step starts.

Here, the washing machine may further include a second water supply unit that supplies water via a connection pipe provided in the tub.

Also, when the washing step starts, the control unit may control the first water supply unit and the second water supply unit so that water is supplied to the tub until a water level of water accommodated in the tub reaches a rinsing water level.

Also, when a rinsing step starts, the control unit may control the first water supply unit so that water is jetted into the drum until the water level of water accommodated in the tub reaches the rinsing water level.

Also, the washing machine may further include a detergent feeder that automatically feeds a detergent to the tub and a user interface that receives information about whether the detergent is automatically fed.

Also, when the automatic feeding of the detergent is input, the control unit may control the detergent feeder so that the detergent is automatically fed while the water is supplied.

Also, the user interface may include a display that displays a washing setting screen which receives a washing setting and an additional setting screen receiving the information about whether the detergent is automatically fed.

Also, the display unit may display the additional setting screen overlapped on the washing setting screen.

Also, the first water supply unit may include a jet nozzle that is disposed in an inlet of the tub and jets water into the drum.

Also, the jet nozzle may obliquely jet water toward a side surface of the drum.

Also, the first water supply unit may include a jet nozzle that jets water into the drum, a first water supply pipe that guides water to the jet nozzle from an external water supply source, and a first water supply valve that opens and closes the first water supply pipe.

Also, the second water supply unit may include a second water supply pipe that guides water from the external water supply source to the connection pipe and a second water supply valve that opens and closes the second water supply pipe.

In accordance with another aspect of the present invention, a control method of a washing machine including a tub that accommodates water and a drum that is rotatably provided inside the tub, includes jetting water into the drum in which a detergent feeding container is positioned when a washing step starts; and stopping jetting of the water when a water level of the water accommodated in the tub reaches a washing water level.

Here, the jetting of the water into the drum may include jetting water from an inlet of the tub toward a side surface of the drum.

Also, the control method of the washing machine may further include supplying water via a connection pipe provided in the tub when the washing step starts.

In accordance with still another aspect of the present invention, a washing machine includes: a drum that is rotatably provided inside a tub; a drum driving unit that rotatably drives the drum, a water supply unit that supplies water to the tub; a user interface that receives information about whether a detergent feeding container is fed in the drum; and a control unit that controls the drum driving unit and the water supply unit to supply water to the tub in a state in which the drum is stopped and to rotate the drum in a state in which supplying of the water is stopped, when the detergent feeding container is fed in the drum.

Here, the control unit may control the water supply unit to stop supplying of the water when a water level of the water is a detergent dissolution water level or higher.

Also, the control unit may control the drum driving unit to stop rotation of the drum when a rotation time of the drum is a detergent outflow time or longer.

Also, the control unit may control the drum driving unit to rotate the drum at a rotational speed of 40 rpm or less.

Also, the control unit may control the drum driving unit to rotate the drum for 4 to 5 seconds and to stop rotation of the drum for 4 to 5 seconds.

In accordance with yet another aspect of the present invention, a control method of a washing machine including a tub that accommodates water and a drum that is rotatably provided inside the tub, includes: receiving information about whether a detergent feeding container is fed in the drum, performing a first water supply when the detergent feeding container is fed; stopping the first water supply and then rotating the drum; and stopping rotation of the drum and then performing the second water supply.

Here, the rotating of the drum may include rotating the drum at a rotational speed of 40 rpm or less.

Also, the rotating of the drum may include rotating the drum for 4 to 5 seconds and stopping rotation of the drum for 4 to 5 seconds.

Advantageous Effects

According to the disclosed one aspect of the present invention, the detergent may be directly fed into the drum, and the detergent may be fully dissolved even though the detergent is directly fed into the drum.

DESCRIPTION OF DRAWINGS

FIGS. 9a and 9b illustrate a detergent dissolution operation of a washing machine in accordance with one embodiment of the present invention when a user directly feeds a detergent.

BEST MODE

Figure 1:
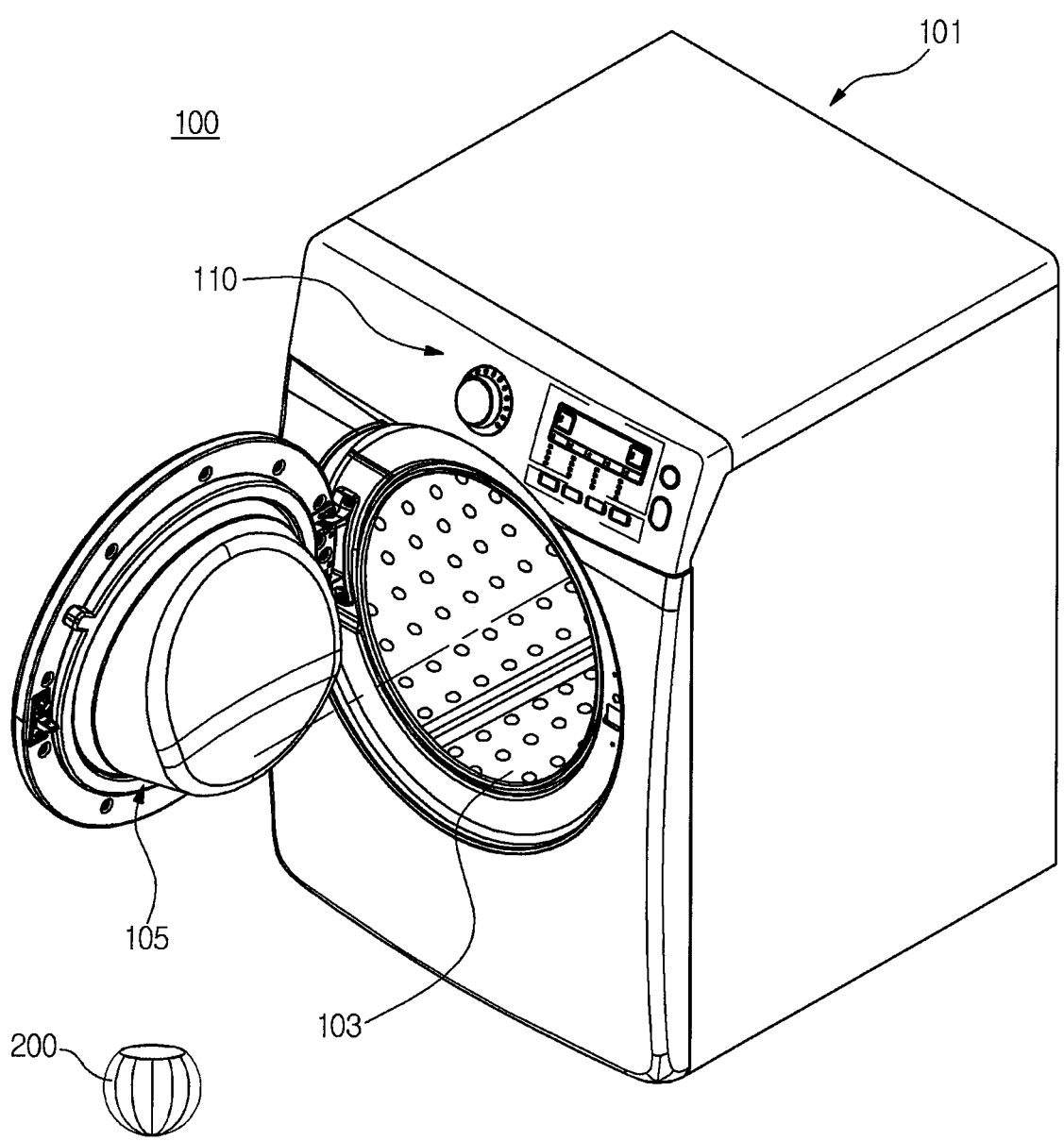
FIG. 1 illustrates the appearance of a washing machine in accordance with one embodiment of the present invention.

Embodiments described in the present specification and configurations illustrated in the drawings are merely preferred embodiments of the disclosed invention, and various modified embodiments that are capable of substituting the embodiments and the drawings of the present specification may exist at the time of applying the present application.

Embodiments described in the present specification and configurations illustrated in the drawings are merely preferred embodiments of the disclosed invention, and various modified embodiments that are capable of substituting the embodiments and the drawings of the present specification may exist at the time of applying the present application.

In addition, the same reference numerals or marks shown in the accompanying drawings may represent a part or an element performing substantially the same function.

In addition, the terms including ordinals such as "first," "second," and the like used in the present specification may be used to describe various elements, but the elements are not limited by the terms, and the terms are used to only distinguish one element from another element.

In addition, the terms such as "include" or "have" used in the present specification are to designate that a characteristic, a number, a step, an operation, an element, a part, described in the specification or combinations thereof exist, and do not exclude in advance the existence of or the possibility of adding one or more other characteristics, numbers, steps, operations, elements, parts, or combinations thereof.

In addition, "Touch" is input as the touch may be caused by the finger including the thumb or a unit (for example, a stylus, etc.).

Hereinafter, a washing machine in accordance with one embodiment of the present invention and a control method for the same will be described in detail with reference to the accompanying drawings.

Figure 2:
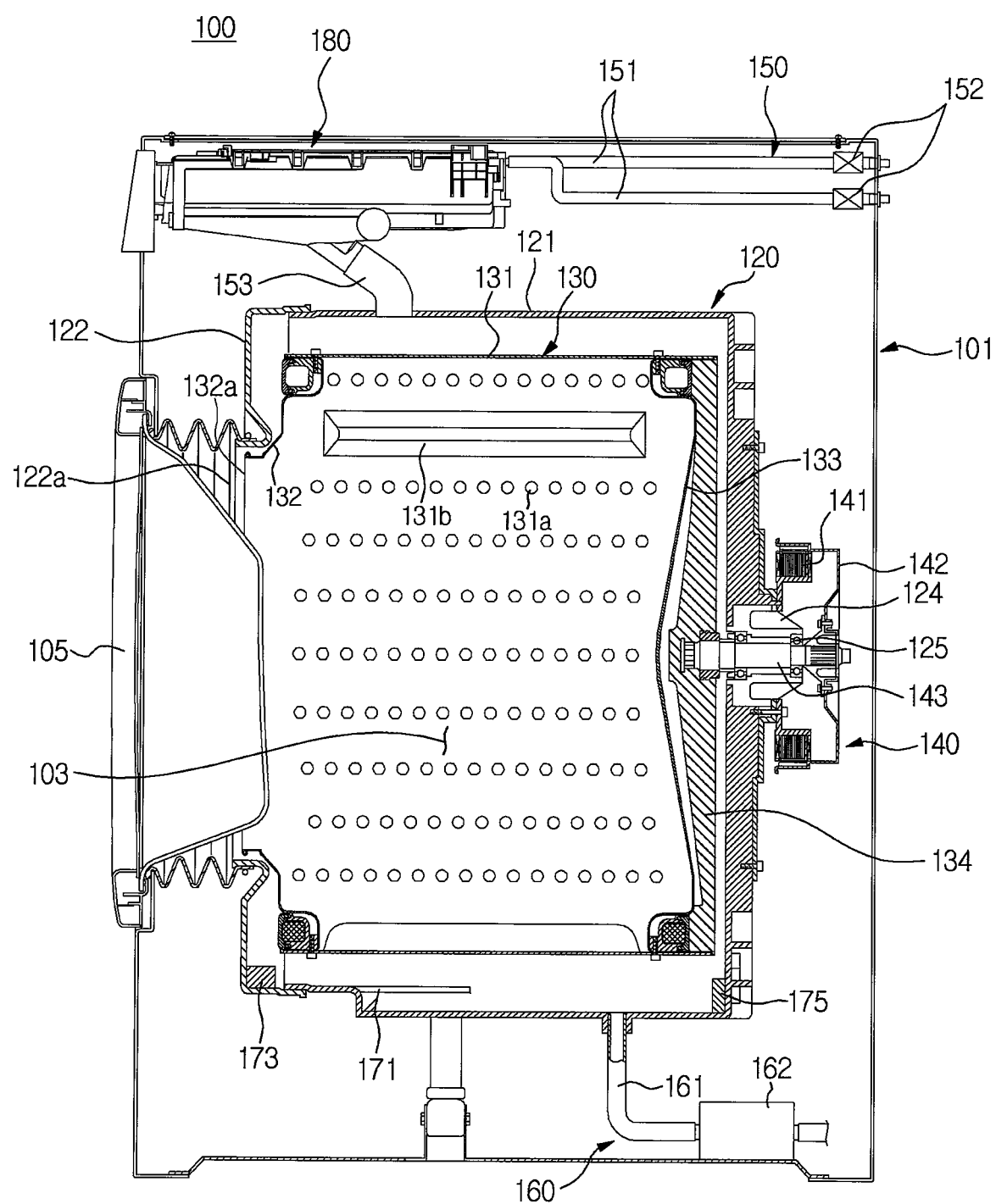
FIG. 2 is a side cross-sectional view illustrating a washing machine in accordance with one embodiment of the present invention.

FIG. 1 illustrates the appearance of a washing machine in accordance with one embodiment of the present invention, and FIG. 2 is a side cross-sectional view illustrating a washing machine in accordance with one embodiment of the present invention.

Referring to FIGS. 1 and 2, the washing machine 100 includes a cabinet 101 that forms an appearance, a tub 120 that is disposed inside the cabinet 101, a drum 130 that is rotatably disposed inside the tub 120, a driving motor 140 that drives the drum 130, a water supply unit 150 that supplies water to the tub 120, a water discharge unit 160 that discharges water accommodated in the tub 120, a detergent supply unit 180 that supplies a detergent, and a detergent feeding container 200 that directly feeds a detergent into the drum 130.

Other than these, the washing machine 100 may include a heater 171 that heats water accommodated in the tub 120, a water temperature sensor 173 that detects a temperature of the water accommodated in the tub 120, and a water level sensor 175 that detects a water level of the water accommodated in the tub 120.

A feeding port for taking in or taking out laundry is provided at a center of a front surface of the cabinet 101, and a door 105 is provided for opening and closing the feeding port of the cabinet 101.

In addition, a control panel 110 for receiving a control command for the washing machine 100 from a user and displaying operation information of the washing machine 100 is provided on an upper side of the front surface of the cabinet 101.

The control panel 110 will be described in detail below.

The door 105 is rotatably mounted in the cabinet 101 to open and close the feeding port formed at the center of the front surface of the cabinet 101.

The tub 120 includes a cylindrical tub body 121 which is provided inside the cabinet 101 and whose rear surface is closed, and a tub front plate 122 which is provided on a front side of the tub body 121.

A bearing 125 for rotatably fixing the driving motor 140 to be described later and a bearing housing 124 are provided on a rear surface of the tub body 121, and an opening 122a for taking in and out laundry to and from a washing chamber 103 is provided on the tub front plate 122.

In addition, the tub 120 is connected to the water supply unit 150 and the detergent supply unit 180 through a connection pipe 153 provided on an upper side of the tub 120, and connected to the water discharge unit 160 through a water discharge pipe 161 provided on a lower side of the tub 120.

The drum 130 is rotatably provided inside the tub 120, and includes a cylindrical drum body 131, a drum front plate 132 provided on a front side of the drum body 131, and a drum rear plate 133 provided on a rear side of the drum body 131.

A through hole 131a through which water accommodated in the tub 120 flows into the washing chamber 103 formed inside the drum 130 and a lifter 131b for lifting laundry upward are provided in the drum body 131.

In addition, an opening 132a for taking in and out laundry to and from the washing chamber 103 is provided in the drum front plate 132, and a shaft flange 134 to which the driving motor 140 to be described later is connected is provided in the drum rear plate 133.

The driving motor 140 includes a stator 141 that is fixed on a rear surface of the tub 120, a rotor 142 that rotates through magnetic interaction with the stator 141, and a rotary shaft 143 whose one side is connected to the rotor 142 and the other side passes through the rear surface of the tub 120 to be connected to the shaft flange 134 provided on a rear surface of the drum 130.

The rotary shaft 143 is rotatably fixed to the tub 120 by the bearing 125 provided on the rear surface of the tub 120 as described above. Such a driving motor 140 may adopt a brushless direct current (BLDC) motor capable of easily controlling a rotation speed or a synchronous alternation current (AC) motor.

The water supply unit 150 is provided on an upper side of the tub 120, and includes a water supply pipe 151 that connects an external water supply source (not shown) and the detergent supply unit 180 and a water supply valve 152 that is provided on the water supply pipe 151 to open and close the water supply pipe 151.

The water discharge unit 160 is provided on a lower side of the tub 120, and includes a water discharge pipe 161 that guides water of the tub 120 to be discharged to the outside of the main body 101 and a water discharge pump 162 that is disposed in the water discharge pipe 161 to allow water to be discharged through the water discharge pipe 161.

The detergent feeding container 200 and the detergent supply unit 180 are provided in order to supply a detergent used in washing into the drum 130.

The detergent feeding container 200 and the detergent supply unit 180 will be described in detail below.

Figure 3A:
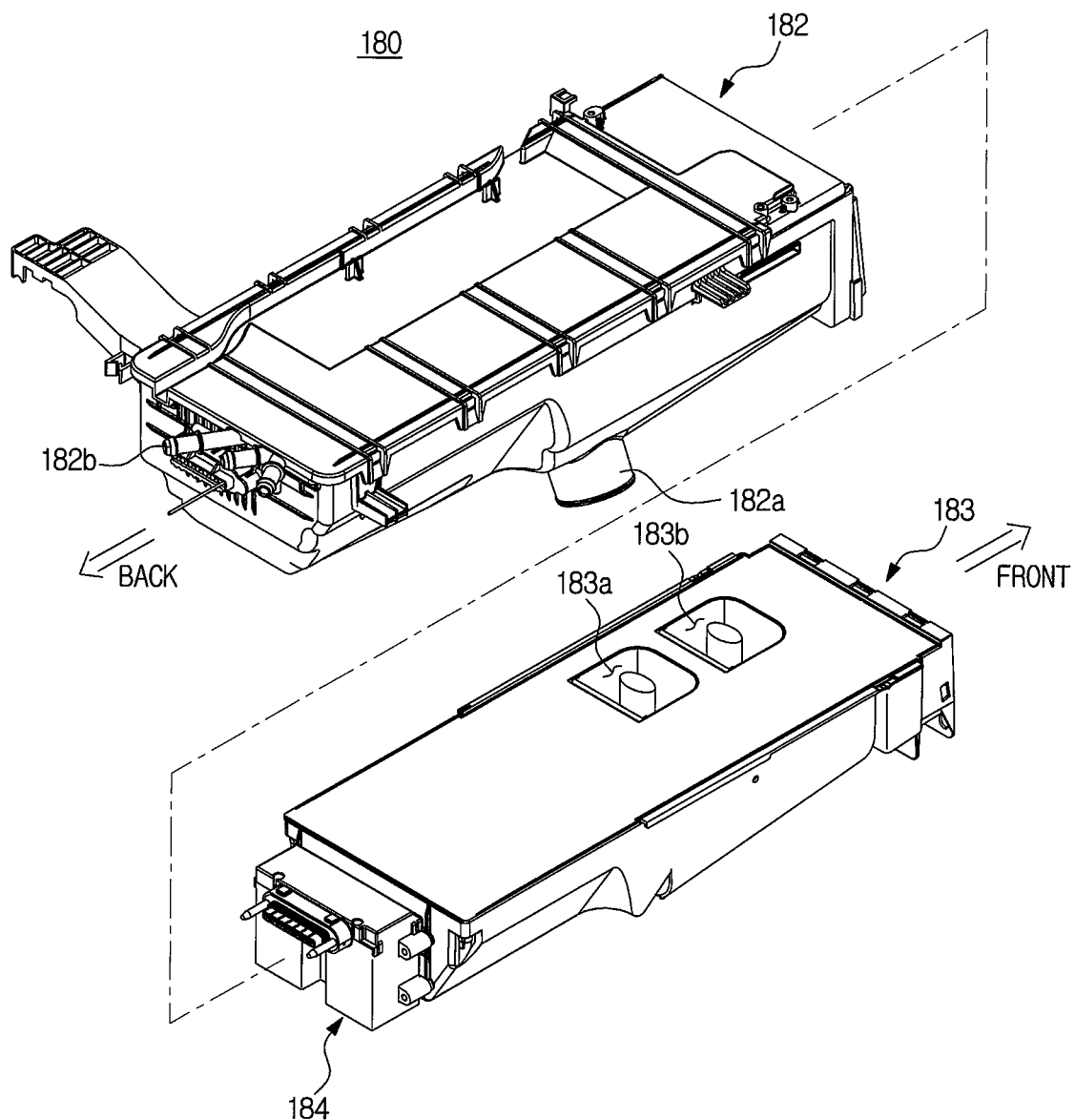
FIGS. 3a and 3b illustrate a detergent supply unit included in a washing machine in accordance with one embodiment of the present invention.
Figure 3B:
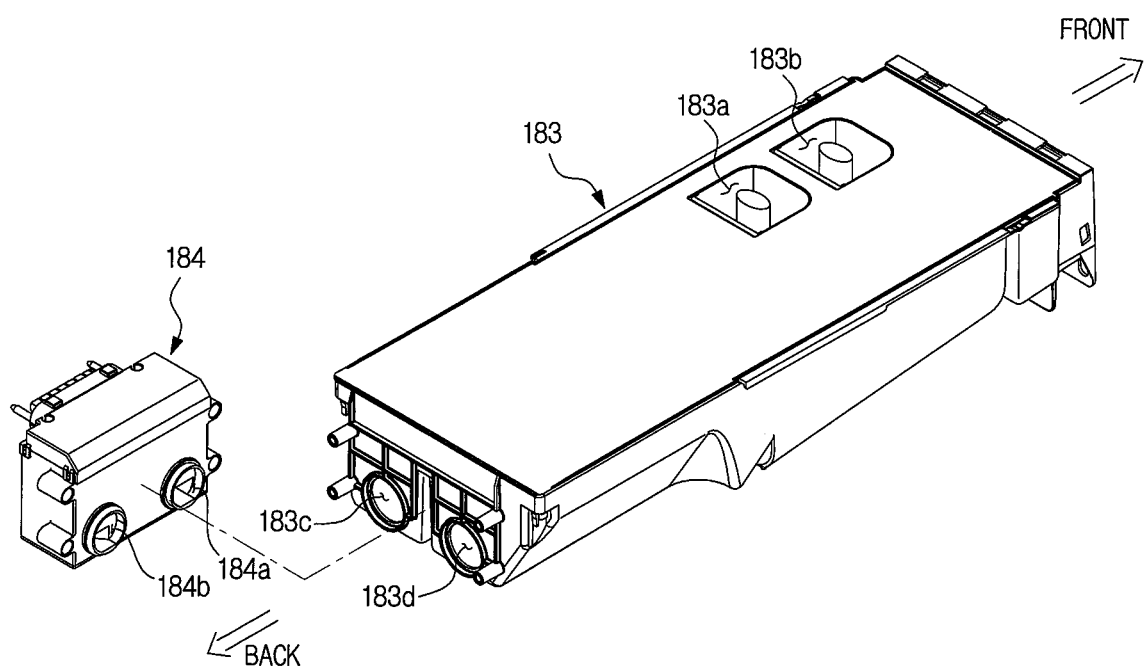
Figure 4:
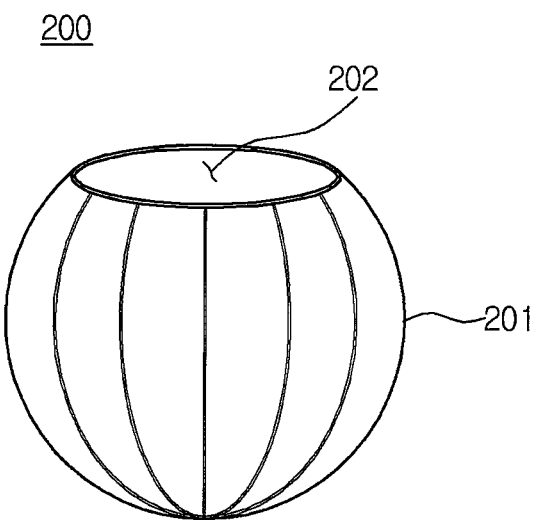
FIG. 4 illustrates a detergent feeding container included in a washing machine in accordance with one embodiment of the present invention.

FIGS. 3a and 3b illustrate a detergent supply unit included in a washing machine in accordance with one embodiment of the present invention, and FIG. 4 illustrates a detergent feeding container included in a washing machine in accordance with one embodiment of the present invention.

As shown in FIGS. 3a and 3b, the detergent supply unit 180 includes a detergent storage container 183 that stores large amounts of detergent and rinse agent, a detergent storage container housing 182 that accommodates the detergent storage container 183, and an automatic detergent feeding module 184 that feeds the detergent or rinse agent stored in the detergent storage container 183 into the washing chamber 103.

The detergent storage container housing 182 is fixed and mounted inside the cabinet 101 of the washing machine 100, a water supply port 182b that receives water from the water supply unit 150 is provided on a rear surface of the detergent storage container housing 182, and a connection port 182a through which a detergent discharged by a detergent feeding pump 184 to be described later and the water supplied through the water supply port 182b are mixed and discharged is provided on a bottom surface of the detergent storage container housing 182. The water and detergent discharged through the connection port 182a are supplied to the tub 120 through the connection pipe 153.

The detergent storage container 183 is movably installed inside the detergent storage container housing 183. Thus, when the detergent or the rinse agent stored in the detergent storage container 183 is all consumed, a user may take out the detergent storage container 183 from the detergent storage container housing 182, and additionally feed the detergent or the rinse agent to the detergent storage container 183.

In addition, the inside of the detergent storage container 183 may be partitioned into a detergent storage space (not shown) for storing a detergent and a rinse agent storage space (not shown) for storing a rinse agent.

On an upper surface of the detergent storage container 183, a detergent feeding port 183a for supplying a detergent into the detergent storage container 183 and a rinse agent feeding port 183b for supplying a rinse agent into the detergent storage container 183 when the detergent and rinse agent stored in the detergent storage container 183 are all consumed are provided.

In addition, on a rear surface of the detergent storage container 183, a detergent outflow hole 183c and a rinse agent outflow hole 183d through which the detergent and rinse agent stored in each of the detergent storage space and the rinse agent storage space are supplied to the detergent supply pump 184 to be described later are provided.

The detergent supply pump 184 may be provided on the rear surface of the detergent storage container 183, and include a detergent pump (not shown) for feeding the detergent stored in the detergent storage space into the washing chamber 103 and a rinse agent pump (not shown) for feeding the rinse agent stored in the rinse agent storage space into the washing chamber 103.

In addition, on a front surface of the detergent supply pump 184, a detergent inflow hole 184a that is formed so as to correspond to the detergent outflow hole 183c provided on the rear surface of the detergent storage container 183 to allow the detergent stored in the detergent storage space (not shown) to flow into the detergent supply pump 184 and a rinse agent inflow hole 184b that is formed so as to correspond to the rinse agent outflow hole 183d to allow the rinse agent to flow into the detergent supply pump 184 are provided.

In addition, on a rear surface of the detergent supply pump 184, a detergent discharge port through which a detergent is discharged and a rinse agent discharge port through which a rinse agent is discharged may be provided.

Such a detergent supply unit 180 may supply the detergent to the washing chamber 103 when supplying washing water for a washing step, and supply the rinse agent to the washing chamber 103 when supplying rinsing water for a rinsing step.

The detergent feeding container 200 includes a feeding container main body 201 that accommodates a detergent as shown in FIG. 4, and a detergent feeding port 202 for feeding the detergent is formed on an upper portion of the feeding container main body 201.

The detergent feeding container 200 is positioned in the drum 130 together with laundry even when performing the rinsing step and a spin-drying step as well as the washing step, and therefore the feeding container main body 201 may have a shape of a sphere or an ellipsoid, and the detergent feeding port 202 through which a user feeds a detergent and the detergent flows out when performing the washing step is provided on the upper portion of the feeding container main body 201.

In addition, on the surface of the feeding container main body 201, a pattern for improving washing power when performing the washing step may be formed. For example, in order to improve frictional force between the surface of the feeding container main body 201 and laundry, a striped pattern or a lattice pattern may be formed on the surface of the feeding container main body 201.

A user may desire to wash laundry using a variety of detergents according to the type of the laundry, particularly, a material or color of the laundry.

For example, when desiring to wash white cotton clothing, a user may use a detergent containing bleach, but when desiring to wash colored silk clothing, the user may use a detergent without bleach.

As another example, when desiring to wash wool clothing, a user may use a detergent for the exclusive use of wool material for laundry protection.

As described above, in the case of the washing machine 100 including the detergent supply unit 180, a user may have difficulties in feeding a separate detergent other than the detergent stored in the detergent supply unit 180. This is because a large amount of detergent has been already stored in the detergent supply unit 180 and therefore it is difficult to store a new detergent in the detergent supply unit.

In this case, a user may accessarily use the detergent feeding container 200. In other words, when desiring to use a detergent different from the detergent stored in the detergent supply unit 180, a user may put the corresponding detergent in the detergent feeding container 200 and directly feed the corresponding detergent into the drum 130.

When a user feeds the detergent feeding container 200 with the corresponding detergent accommodated therein into the drum 130 together with laundry, and then operates the washing machine 100, the detergent accommodated in the detergent feeding container 200 flows into the drum 130 while the drum 130 is rotating.

In this manner, basically, the detergent may be supplied automatically through the detergent supply unit 180 by the washing machine 100, but may be directly fed into the drum 130 through the detergent feeding container 200 by a user according to the user's selection. In other words, the user may supply the detergent in such a manner as to put the detergent in the detergent feeding container 200 and to position the detergent feeding container 200 with the detergent accommodated therein into the drum 130.

In this manner, when the user directly feeds the detergent into the drum 130 through the detergent feeding container 200 and activates a detergent dissolution operation through the control panel 110 to be described later, the washing machine 100 performs a detergent dissolution operation for dissolving the detergent directly fed into the drum 130.

The detergent dissolution operation will be described in detail below.

In addition, when the detergent dissolution operation is activated, the washing machine 100 may deactivate the detergent supply unit 180. In other words, the washing machine 100 prevents the detergent from being doubly supplied by preventing the detergent supply unit 180 from being operated.

Basically, the above-described washing machine 100 automatically feeds the detergent through the detergent supply unit 180. In other words, the washing machine 100 performs washing while the detergent dissolution operation is activated, and deactivates the detergent dissolution operation again when the washing is completed.

In addition, when the detergent dissolution operation is not activated by a user in next washing, the washing machine 100 supplies the detergent through the detergent supply unit 180 and does not perform the detergent dissolution operation.

Figure 5:
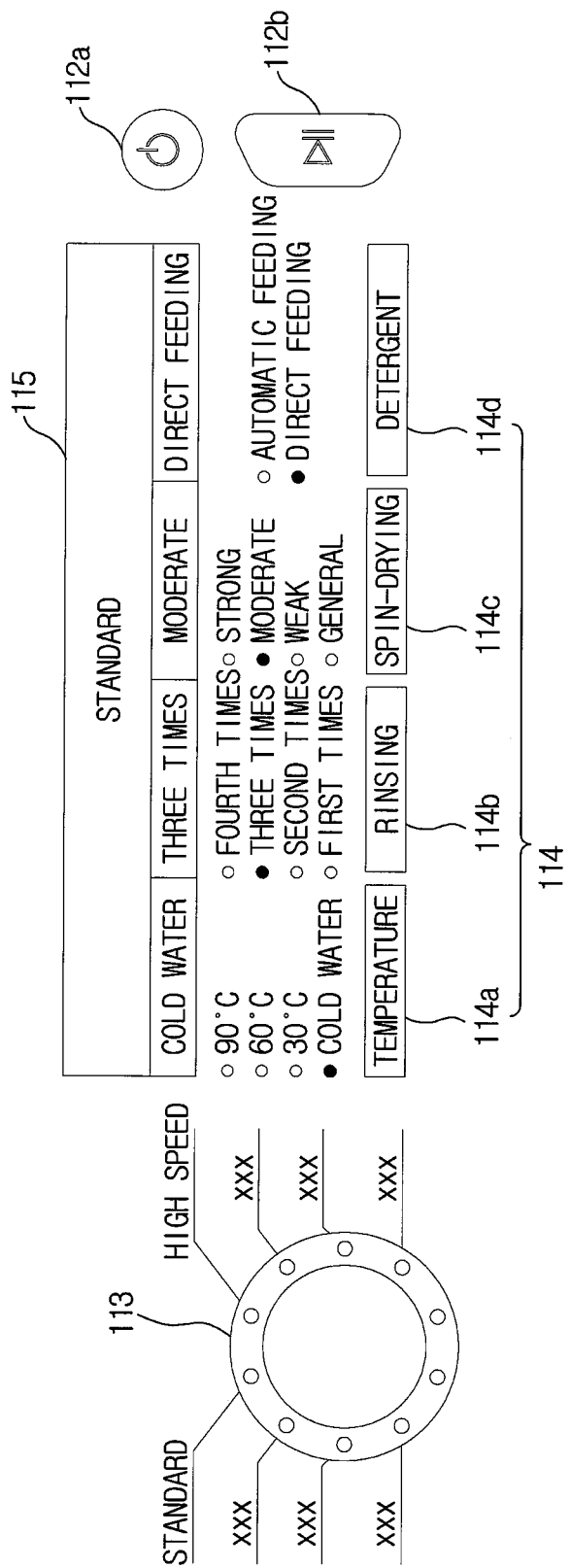
FIG. 5 illustrates a control panel provided in a washing machine in accordance with one embodiment of the present invention.

FIG. 5 illustrates a control panel provided in a washing machine in accordance with one embodiment of the present invention.

As shown in FIG. 5, the control panel 110 may include a power button 112a for turning ON/OFF power of the washing machine 100, a washing start button 112b for operating or stopping the washing machine 100, a dial 113 for selecting a washing course in which detailed settings of a washing step, a rinsing step, and a spin-drying step are stored in advance according to the type of laundry, a detailed setting button 114 for setting a detailed item of the washing course selected by the dial 112, and a display panel 115 for displaying operation information of the washing machine 100.

The detailed setting button 114 may include a water temperature setting button 114a for setting a temperature of water used in washing, a rinsing setting button 114b for setting rinsing frequency, a spin-drying setting button 114c for setting the strength of spin-drying, and a detergent direct feeding button 114d for fully dissolving the directly fed detergent when a user directly feeds the detergent into the drum 130.

Specifically, when a user directly feeds the detergent into the drum 130 and then pushes the detergent direct feeding button 114d, the washing machine 100 activates the detergent dissolution operation, and when the user pushes the detergent direct feeding button 114d again while the detergent dissolution operation is activated, the washing machine 100 deactivates the detergent dissolution operation.

When the user inputs a washing start command through the washing start button 112b in a state in which the detergent dissolution operation is activated, the washing machine 100 checks whether the detergent is directly fed into the drum 130 through the display panel 115. This is because there is a possibility that the user does not feed the detergent into the drum 130 by mistake after activating the detergent dissolution operation.

When it is checked that the detergent is directly fed into the drum 130, the washing machine 100 performs the detergent dissolution operation in order to dissolve the directly fed detergent.

The power button 112a, the washing start button 112b, and the detailed setting button 114 may adopt a micro switch or membrane switch for detecting the pressure by a user, a touch pad for detecting the touch by a user, and the like.

The display panel 115 may display the washing course selected by the dial 113, the detailed setting selected by the detailed setting button 114, information about operations performed by the washing machine 100, information related to operations of the washing machine 100 such as the remaining time until the termination of washing.

The display panel 116 may adopt a liquid crystal display (LCD) panel, a light emitting diode (LED) panel, or an organic light emitting diode (OLED) panel.

In addition, the control panel 110 may include a touch screen panel (TSP) in which a touch pad that receives a control command from a user and a display panel that displays operation information of the washing machine 100 are integrated.

The washing machine 100 shown in FIGS. 1 and 2 includes the detergent supply unit 180 that automatically supplies the detergent into the drum, but the present invention is not limited thereto. For example, when a user feeds a dose of detergent into an openable drawer-type detergent container (not shown), the detergent in the detergent container may be supplied into the drum during water supply.

Even in a case of including the drawer-type detergent container, when a user activates the detergent dissolution operation, the washing machine performs the detergent dissolution operation in order to dissolve the detergent directly fed into the drum by the user.

In addition, when including the drawer-type detergent container (not shown), the washing machine may select any one of detergent supply through the detergent container and detergent direct supply through the detergent feeding container 200.

In other words, when the washing machine includes the detergent supply unit, detergent supply through the detergent supply unit is performed by default and detergent direct supply through the detergent feeding container 200 is possible by a user's selection. In addition, when the washing machine does not include the detergent supply unit, a user may select any one of detergent supply through the detergent container and detergent direct supply through the detergent feeding container 200.

Figure 6:
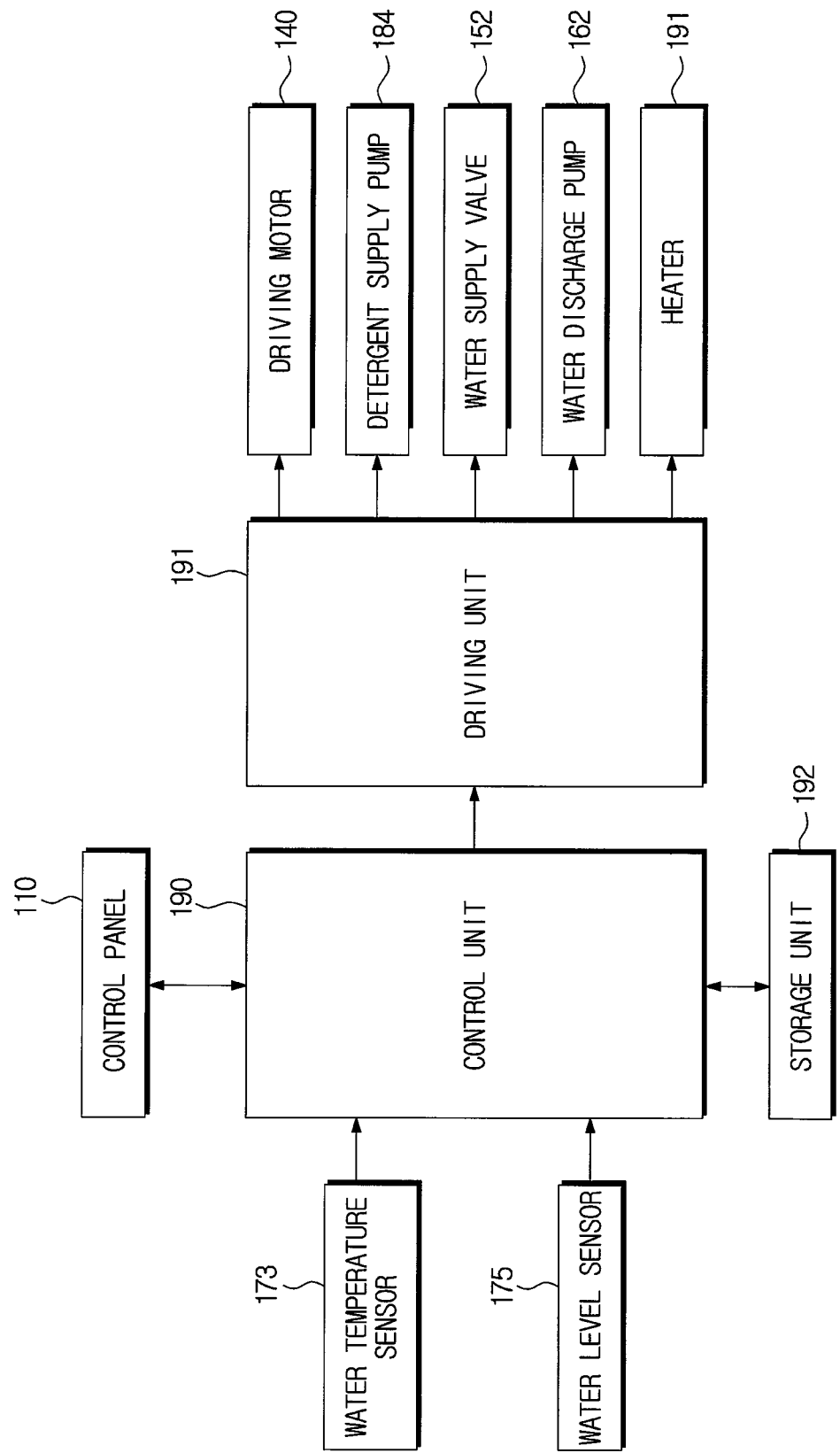
FIG. 6 illustrates a control flow of a washing machine in accordance with one embodiment of the present invention.

FIG. 6 illustrates a control flow of a washing machine in accordance with one embodiment of the present invention.

Referring to FIG. 6, the washing machine 100 includes the above-described control panel 110, the tub 120, the drum 130, the driving motor 140, the water supply unit 150, the water discharge unit 160, the detergent supply unit 180, the heater 171, a driving unit 191 that drives various components included in the washing machine 100 together with the water temperature sensor 173 and the water level sensor 175, a storage unit 192 that stores programs and data related to operations of the washing machine 100, and a control unit 190 that controls operations of the washing machine 100.

The driving unit 191 may drive the driving motor 140, the water supply valve 152 (see FIG. 3) included in the water supply unit 150, the water discharge pump 162 (see FIG. 3) included in the water discharge unit 160, the automatic detergent feeding module 184 (see FIG. 3) included in the detergent supply unit 180, and the heater 171 according to control signals of the control unit 190. In particular, the driving unit 191 may include an inverter for controlling a rotation speed and a rotation direction of the driving motor 140.

The storage unit 192 may include a non-volatile memory such as a magnetic disc or a solid state disk for permanently storing programs and data for controlling operations of the washing machine 100 and a volatile memory such as a D-RAM or an S-RAM for temporarily storing temporary data generated in a process of controlling the operations of the washing machine 100.

The control unit 190 generates control signals for controlling the driving motor 140, the water supply unit 150, the water discharge unit 160, the detergent supply unit 180, and the heater 171 in accordance with a user's control commands input through the control panel 110 and the detection results of the water temperature sensor 173 and the water level sensor 175, and transmits the generated control signals to the driving unit 191.

In particular, when the detergent dissolution operation is activated through the detergent direct feeding button 114d, the control unit 190 performs the detergent dissolution operation for dissolving the detergent directly fed into the drum 130 by the user as will be described later.

The configuration of the washing machine 100 has been described above, and operations of the washing machine 100 in accordance with one embodiment of the present invention will be herein described. In particular, the detergent dissolution operation for dissolving the detergent directly fed into the drum will be described.

Referring again to FIG. 2, the washing machine 100 performs a washing step that supplies a detergent and water into the drum 130 and then rotates the drum 130 to separate foreign substances attached to laundry, a rinsing step that supplies a rinse agent and water into the drum 130 and then rotates the drum 130 to rinse the foreign substances separated from the laundry and detergent residues, and a spin-drying step that rotates the drum 130 at a high speed to separate water from the laundry.

In addition, the washing machine 100 may perform a water supply operation that supplies water to the washing chamber 103 before performing the washing step and the rinsing step, and perform an intermediate spin-drying step after completing the washing step and the rinsing step.

The washing machine 100 rotates the drum 130 at a speed of 45 to 60 rpm in clockwise and counterclockwise directions when performing the washing step and the rinsing step. In addition, the washing machine 100 may repeatedly perform processes of rotating the drum 130 for approximately 20 seconds (ON time) clockwise and then stopping the drum 130 for 4 to 5 seconds (OFF time), and rotating the drum 130 for approximately 20 seconds (ON time) counterclockwise and then stopping the drum 130 for 4 to 5 seconds (OFF time).

The washing machine 100 may rotate the drum 130 in any one of clockwise and counterclockwise directions at a speed of several hundreds to thousands of rpm when performing the spin-drying step, so that water absorbed in the laundry is discharged to the outside of the drum 130 by a centrifugal force.

Particularly, the washing machine 100 according to an embodiment of the present invention automatically feeds the detergent into the drum 130 through the detergent supply unit 180 by default in relation to a detergent feeding method, but a user may directly feed the detergent into the drum 130 in accordance with selection of the user.

When the user directly feeds the detergent into the drum 130, the washing machine 100 performs the detergent dissolution operation for dissolving the detergent directly fed into the drum 130.

Figure 7A:
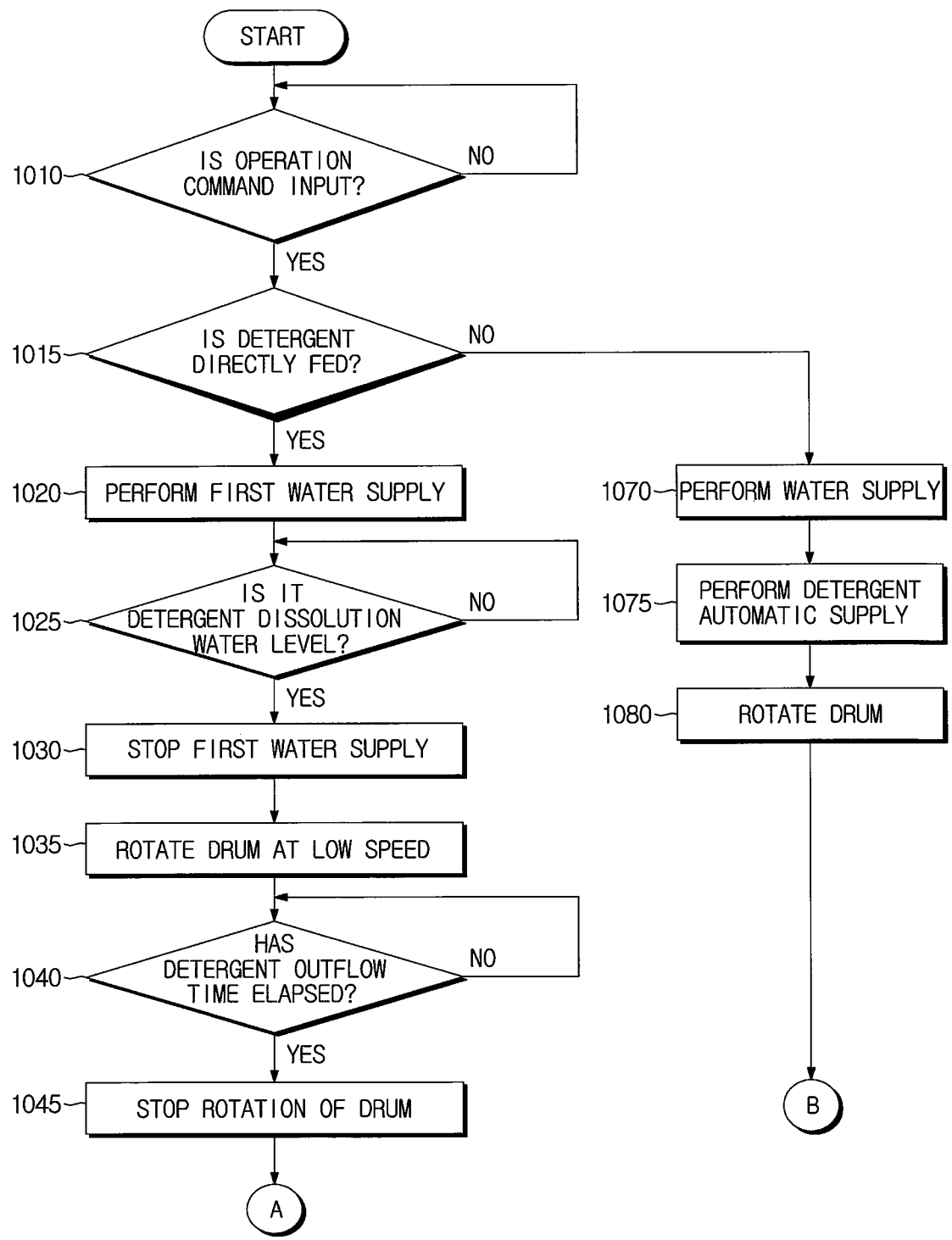
FIGS. 7a and 7b illustrate a method of dissolving a detergent of a washing machine in accordance with one embodiment of the present invention.
Figure 7B:
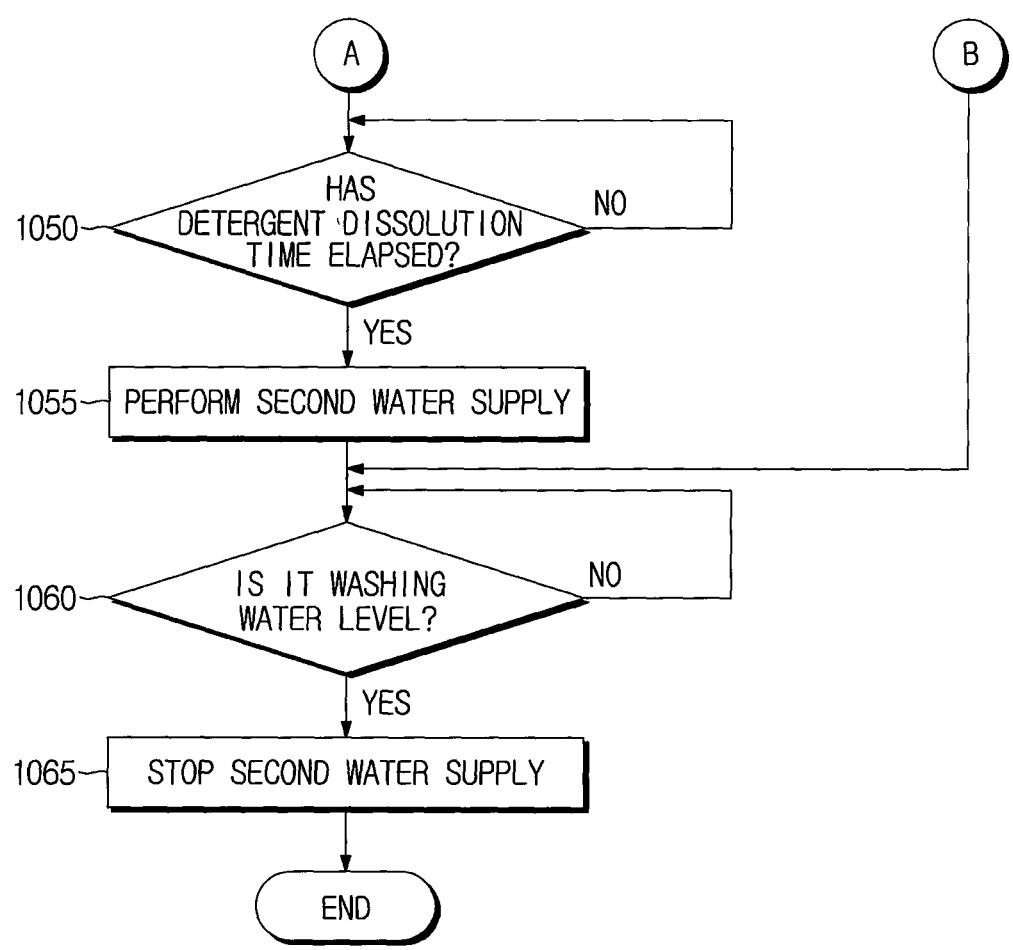
Figure 8:
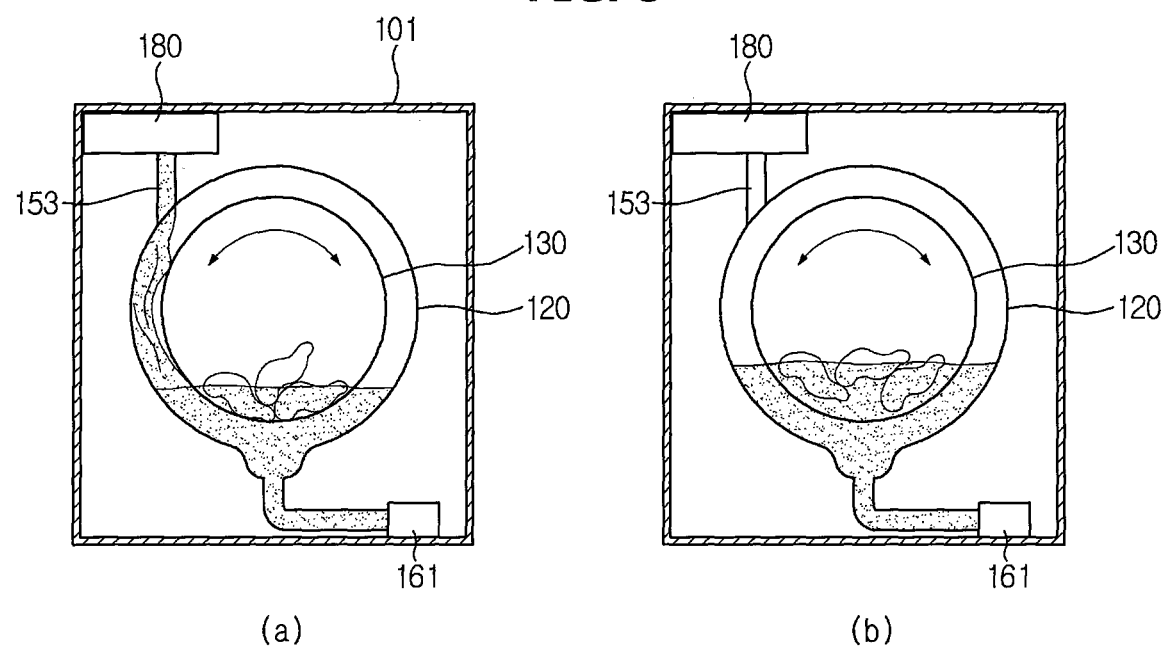
FIG. 8 illustrates a detergent dissolution operation of a washing machine in accordance with one embodiment of the present invention when a detergent is automatically supplied by the washing machine.
Figure 9B:
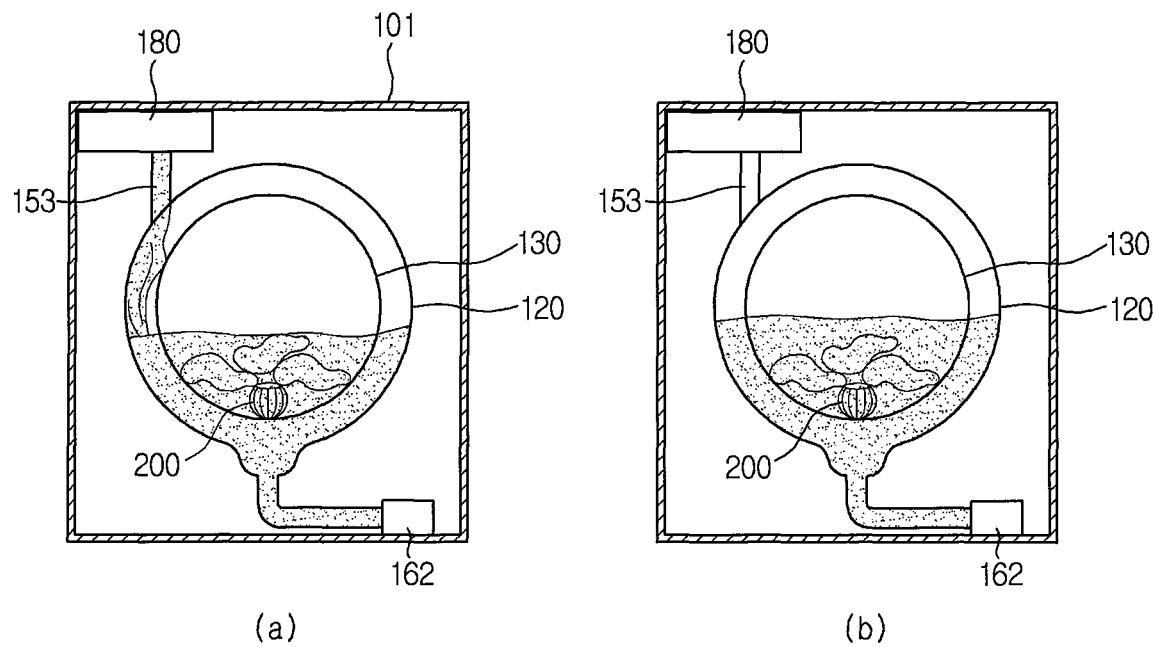

FIGS. 7a and 7b illustrate a method of dissolving a detergent of a washing machine in accordance with one embodiment of the present invention, FIG. 8 illustrates a detergent dissolution operation of a washing machine in accordance with one embodiment of the present invention when a detergent is automatically supplied by the washing machine, and FIGS. 9a and 9b illustrate a detergent dissolution operation of a washing machine in accordance with one embodiment of the present invention when a user directly feeds a detergent.

Referring to FIGS. 7a to 9b, in operation 1010, the washing machine 100 determines whether a user inputs an operation command.

A user may feed laundry to the washing chamber 103, select a washing course through the dial 113 provided in the control panel 110, and select detailed setting through the detailed setting button 114 in accordance with the selected washing course.

In this instance, the user may activate the detergent dissolution operation for dissolving the detergent directly fed into the drum 130 using the detergent direct feeding button 114d.

Specifically, when feeding the detergent feeding container 200 with the detergent accommodated therein, a detergent pack with a liquid detergent accommodated therein, a solid detergent, or the like into the drum 130 together with laundry, the user may activate the detergent dissolution operation. In addition, when not directly feeding the detergent into the drum 130, the user may deactivate the detergent dissolution operation.

In addition, the user may determine whether the detergent dissolution operation is activated through the control panel 110.

The user having selected the washing course and the detailed setting may input an operation command through the washing start button 112b provided in the control panel 110. The operation command is a control command for allowing the washing machine to start the washing operation with respect to the laundry.

In other words, the user may select the washing course and the detailed setting, feed the detergent feeding container 200 into the washing chamber, and activate the detergent dissolution operation. Next, the user may input the operation command for the washing machine 100.

In operation 1015, when the operation command is input (YES of 510), the washing machine 100 determines whether the detergent is directly fed.

When the user inputs whether the detergent dissolution operation is activated, the washing machine 100 may store, in the storage unit 192, whether the detergent is directly fed in accordance with whether the detergent dissolution operation is activated. Thereafter, when the user inputs the operation command, the washing machine 100 may determine whether a direct detergent feeding function is activated based on values stored in the storage unit 192.

When it is determined that the direct detergent feeding function is deactivated (NO of 1015), the washing machine 100 supplies water to the washing chamber 103 as shown in (a) of FIG. 8. The washing machine 100 may allow water to be supplied to the washing chamber 103 via the detergent supply unit 180 by opening the water supply valve 152 of the water supply unit 150.

At the same time, in operation 1075, the washing machine 100 automatically supplies the detergent into the washing chamber 103. The washing machine 100 may allow the detergent to be supplied to the washing chamber 103 together with water by operating the detergent supply pump 184 of the detergent supply unit 180.

In this instance, the amount of the supplied detergent may be changed according to the washing course and the amount of washing water. That is, the washing machine 100 supplies the detergent for an amount to exhibit optimal washing power in accordance with the washing course and the amount of laundry.

In addition, in operation 1080, the washing machine 100 rotates the drum in a clockwise or counterclockwise direction at a low speed.

When the washing machine 100 supplies the detergent and water, the detergent and water may stay in a lower portion of the tub 120. In this case, the washing machine 100 rotates the drum 130 in clockwise and counterclockwise directions at a low speed as shown in (a) of FIG. 8 so that the detergent and water can be fully mixed.

When the drum 130 is rotated at the low speed, a water flow is generated in the water and detergent of the low portion of the tub 120 by rotational force of the drum 130, and therefore the water and detergent are mixed.

In addition, the rotation of the drum 130 may be the same as rotation of the drum 130 at the time of washing step. That is, the washing machine 100 may repeatedly perform processes of rotating the drum 130 for approximately 20 seconds (ON time) in the clockwise direction and then stopping the drum 130 for 4 to 5 seconds (OFF time), and rotating the drum 130 for approximately 20 seconds (ON time) in the counterclockwise direction and then stopping the drum 130 for 4 to 5 seconds (OFF time), while rotating the drum 130 at a rotation speed of 45 to 60 rpm.

Next, in operation 1060, the washing machine 100 determines whether a water level of water reaches a washing water level. The washing water level is a water level that can exhibit sufficient washing power by the rotation of the drum 130 and the detergent, and may be changed according to the washing course and the amount of laundry.

When the water level of water does not reach the washing water level (NO of 1060), the washing machine 100 continues to supply water, and when the water level of water reaches the washing water level (YES of 1060), the washing machine 100 stops the supply of water in operation 1065.

Next, the washing machine 100 performs a washing step that rotates the drum 130 in the clockwise and counterclockwise directions as shown in (b) of FIG. 8.

Next, in operation 1020, when it is determined that the direct detergent feeding function is activated (YES of 1015), the washing machine 100 performs first water supply as shown in (a) of FIG. 9a. Specifically, the washing machine 100 supplies water to the washing chamber 103 by opening the water supply valve 152 of the water supply unit 150. In addition, during the first water supply, the washing machine 100 may not rotate the drum 130 as shown in (a) of FIG. 9a.

When directly feeding the detergent feeding container 200 with the detergent accommodated therein, a detergent pack with a liquid detergent accommodated therein, or a solid detergent into the drum 130, a user may feed laundry into the drum 130, and then feed the detergent feeding container 200 with the detergent accommodated therein, the detergent pack with the liquid detergent accommodated therein, or the solid detergent into the washing chamber 103.

As a result, the detergent feeding container 200 with the detergent accommodated therein, the detergent pack with the liquid detergent accommodated therein, or the solid detergent may be positioned on the laundry. In addition, water stays only in the lower portion of the tub 120 at the initial time of water supply, and is not yet supplied in the washing chamber 103 in which the detergent and the laundry are accommodated.

In this manner, when the washing machine 100 rotates the drum 130 in a state in which the detergent feeding container 200 with the detergent accommodated therein, the detergent pack with the liquid detergent accommodated therein, or the solid detergent is fed into the drum 130 and water is not fed into the drum 130, the detergent within the detergent feeding container 200 or the detergent within the detergent pack flows out to the laundry, and therefore the flowing detergent is brought into contact with the laundry.

In this case, the detergent may damage the laundry. For example, when the washing machine 100 operates in a state in which the detergent undissolved in water is attached to the laundry, the detergent may remain in the laundry even though a rinsing step for removing the detergent remaining in the laundry is performed, and the detergent remaining in the laundry may damage the laundry.

In particular, in a case of cold water washing or high-speed washing in which a time for performing a washing step and a rinsing step is short, a large amount of detergent may remain in the laundry without being washed away during the rinsing step.

In addition, when the drum 130 is rotated before water is supplied into the drum 130, the laundry may surround the detergent feeding container 200, the detergent pack, or the solid detergent due to the rotation of the drum 130.

In this manner, when the laundry surrounds the detergent feeding container 200, the detergent pack, or the solid detergent, the detergent accommodated in the detergent feeding container 200 or the detergent pack or the solid detergent may be densely attached to only a part of the laundry, and in this case, the detergent is highly likely to remain in the laundry after washing.

Due to the above-described reason, the drum 130 may not be rotated until the water level of water reaches a water level for detergent dissolution, but the present invention is not limited thereto. For example, water may be supplied until the lower portion of the drum 130 is submerged, and then the drum 130 may be rotated at a low speed during the first water supply.

Next, in operation 1025, the washing machine 100 determines whether the water level of water reaches the water level for detergent dissolution. The water level for detergent dissolution may be determined as a water level in which the detergent within the detergent feeding container 200, the detergent within the detergent pack, or the solid detergent can be sufficiently brought into contact with water when the drum 130 is rotated.

When the water level of water does not reach the water level for detergent dissolution (NO of 1025), the washing machine 100 continues to perform the first water supply, and when the water level of water reaches the water level for detergent dissolution (YES of 1025), the washing machine 100 stops the first water supply as shown in (b) of FIG. 9a in operation 1030.

Next, in operation 1035, as shown in (c) of FIG. 9a, the washing machine 100 rotates the drum 130 in clockwise and counterclockwise directions at a low speed.

When the water level of supplied water reaches the water level for detergent dissolution, the washing machine 100 rotates the drum 130 at a low speed so that the detergent accommodated in the detergent feeding container 200 or the detergent accommodated in the detergent pack gradually flow out to be brought into contact with water.

In this instance, when rotating the drum at a high speed, the detergent accommodated in the detergent feeding container 200 or the detergent accommodated in the detergent pack rapidly flows out, and therefore there is a possibility that a large amount of detergent is attached to a part of the laundry.

Thus, the washing machine 100 repeatedly performs processes of rotating the drum 130 for 4 to 5 seconds in the clockwise direction and then stopping the drum 130 for 4 to 5 seconds, and rotating the drum 130 for 4 to 5 seconds in the counterclockwise direction and then stopping the drum 130 for 4 to 5 seconds, while rotating the drum 130 at a speed of 40 rpm or less. In other words, the rotation speed of the drum 130 may be made slower and the rotation time of the drum 130, that is, ON time may be made shorter compared to in an automatic detergent supply mode.

In operation 1040, the washing machine 100 determines whether a detergent outflow time has elapsed while the drum 130 is rotated at a low speed. The detergent outflow time may be determined as a time during which the detergent accommodated in the detergent feeding container 200 or the detergent accommodated in the detergent pack sufficiently flows out to the outside. In other words, the detergent outflow time may be determined as a time during which most of the detergent may flow out from the detergent feeding container 200 or the detergent packet.

When the detergent outflow time has not elapsed (NO of 540), the washing machine 100 continues to rotate the drum 130 at a low speed, and when the detergent outflow time has elapsed (YES of 540), the washing machine 100 stops the rotation of the drum 130 as shown in (d) of FIG. 9a in operation 1045. In this manner, stopping the rotation of the drum 130 is to fully dissolve, in water, the detergent flowing out from the detergent feeding container 200 or the detergent pack.

For example, in a case of the detergent feeding container 200, even though the drum 130 is rotated at a low speed to allow the detergent accommodated in the detergent feeding container 200 to flow out, a part of the detergent may be still attached to the inner surface of the detergent feeding container 200. In this manner, in order to dissolve even the detergent attached to the inner surface of the detergent feeding container 200 in water, the drum 130 may not be rotated in a state in which the detergent feeding container 200 is submerged in water.

In operation 1050, after stopping the drum 130, the washing machine 100 determines whether a detergent dissolution time has elapsed. The detergent dissolution time may be determined as a time during which the detergent flowing out from the detergent feeding container 200 or the detergent pack or the pulverized solid detergent can be fully dissolved in water. In other words, the detergent dissolution time may be determined as a time during which the detergent can be dissolved in water.

In operation 1055, when the detergent dissolution time has elapsed (YES of 550), the washing machine 100 performs second water supply as shown in (a) of FIG. 9*b*. The washing machine 100 may stop the drum 130 while performing the second water supply. However, the present invention is not limited thereto, and the washing machine 100 may rotate the drum 130 so that the detergent is dissolved better in water.

In operation 1060, the washing machine 100 determines whether a water level of water reaches a washing water level during the second water supply. The washing water level may be a water level to exhibit sufficient washing power by the rotation of the drum 130 and the detergent, and changed in accordance with the washing course and the amount of laundry.

When the water level of water does not reach the washing water level (NO of 560), the washing machine 100 continues to supply water, and when the water level of water reaches the washing water level (YES of 560), the washing machine 100 stops water supply as shown in (b) of FIG. 9*b* in operation 1065.

Next, the washing machine 100 performs a washing step that rotates the drum 130 in clockwise and counterclockwise directions as shown in (c) of FIG. 9*b*.

When a user directly feeds the detergent into the washing chamber 103, the washing machine 100 may smoothly dissolve the directly fed detergent by performing the detergent dissolution operation.

Hereinafter, a washing machine in accordance with another embodiment of the present invention and a control method for the same will be described in detail with the accompanying drawings.

Figure 10:
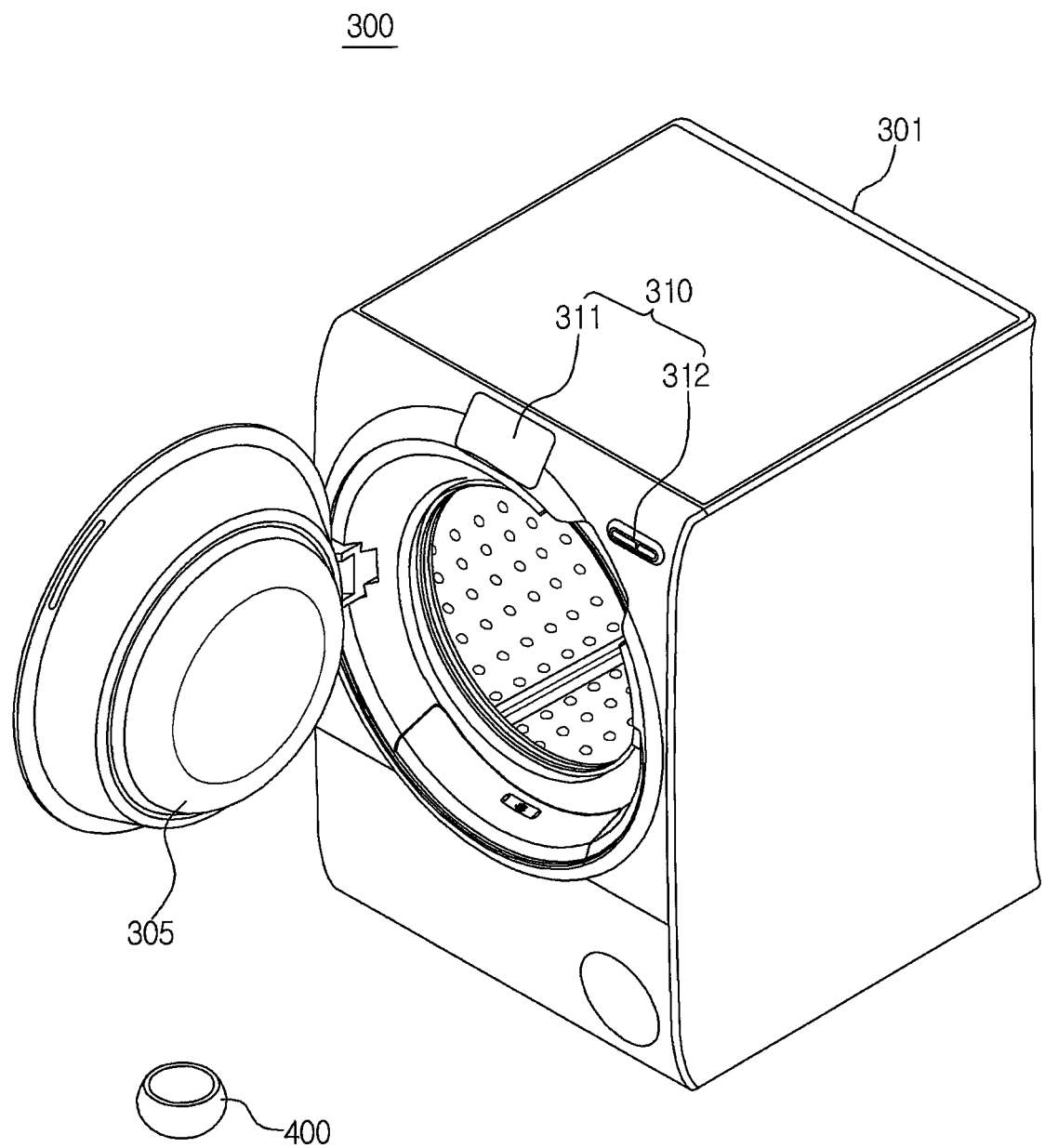
FIG. 10 illustrates the appearance of a washing machine in accordance with another embodiment of the present invention.
Figure 11:
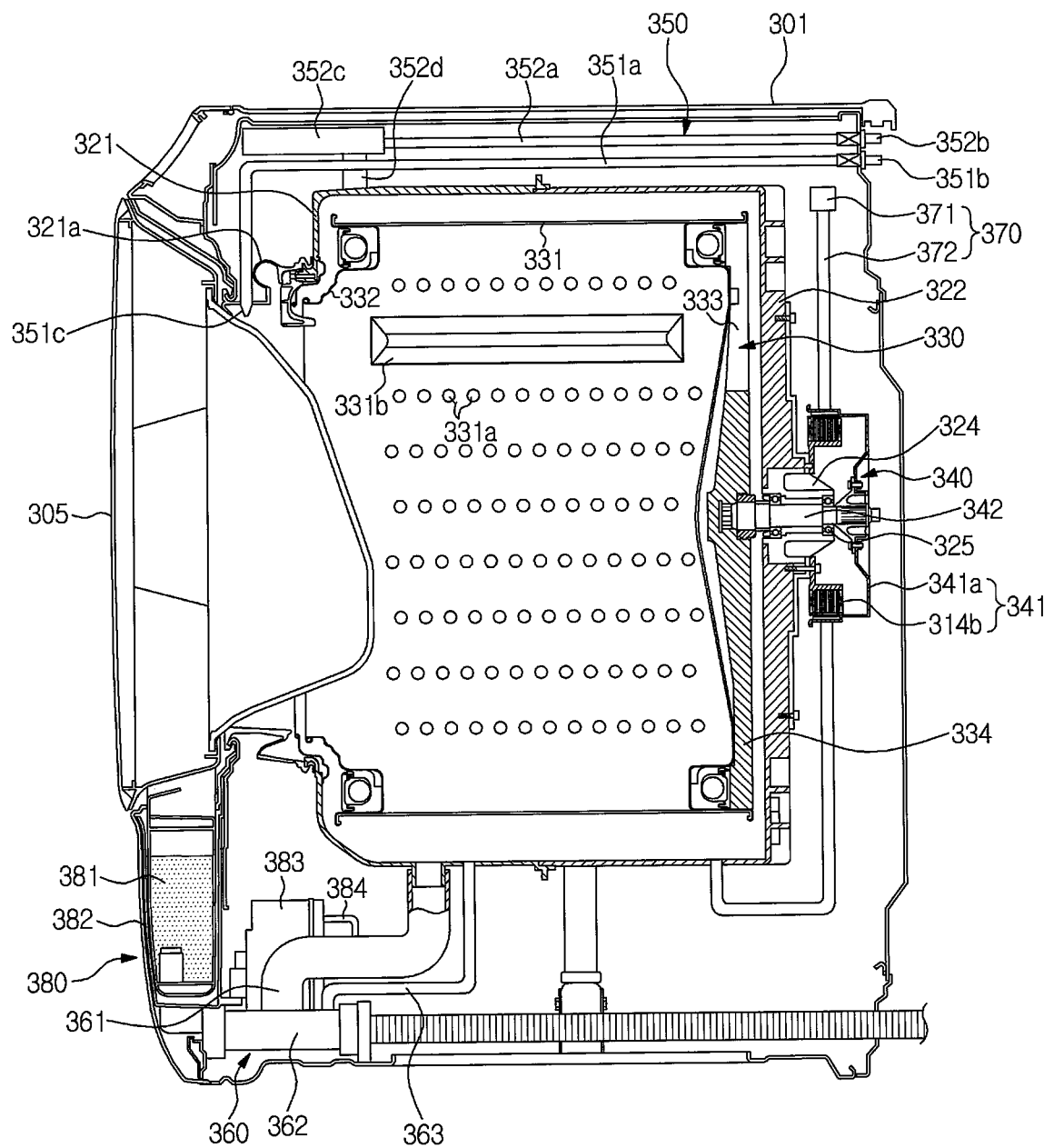
FIG. 11 is a side cross-sectional view illustrating a washing machine in accordance with another embodiment of the present invention.
Figure 12:
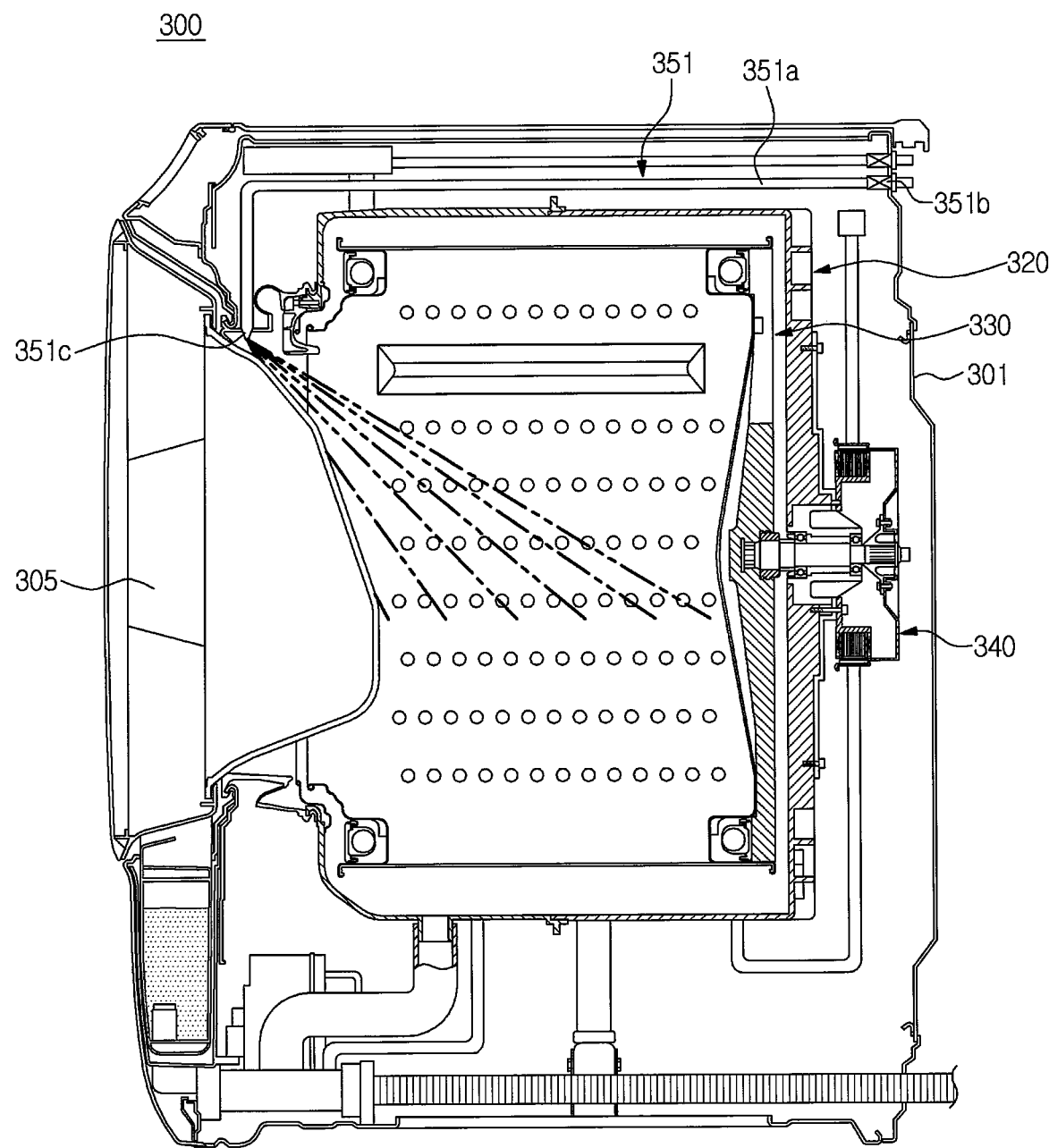
FIGS. 12 and 13 illustrate a path of water jetted by a jet nozzle included in a washing machine in accordance with another embodiment of the present invention.
Figure 13:
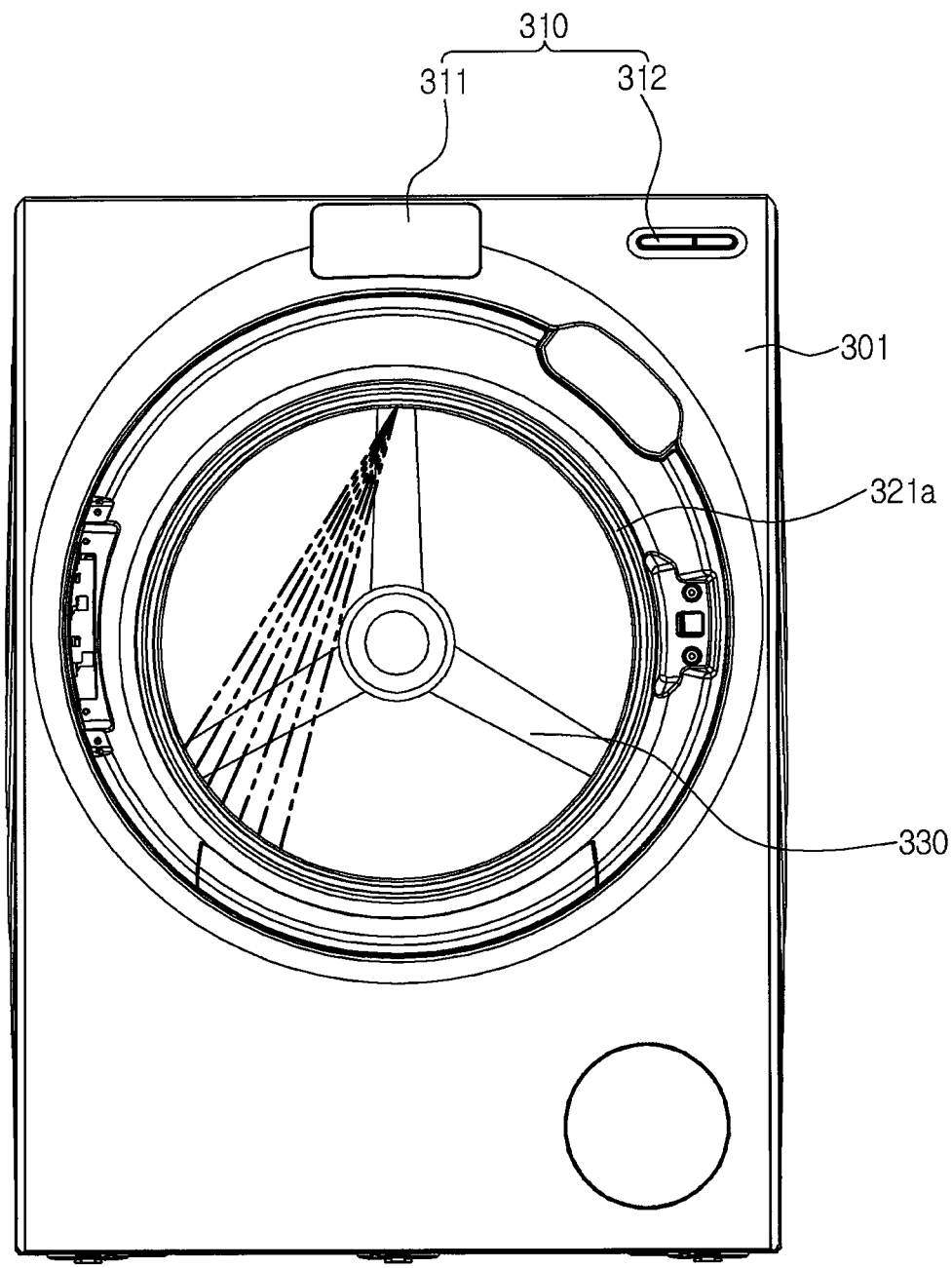

FIG. 10 illustrates the appearance of a washing machine in accordance with another embodiment of the present invention, FIG. 11 is a side cross-sectional view illustrating a washing machine in accordance with another embodiment of the present invention, and FIGS. 12 and 13 illustrate a path of water jetted by a jet nozzle included in a washing machine in accordance with another embodiment of the present invention.

Referring to FIGS. 10 to 13, a washing machine 300 includes a cabinet 101 that forms the appearance of the washing machine 300, a tub 320 that is disposed inside the cabinet 101, a drum 330 that is rotatably disposed inside the tub 320, and a drum driving unit 340 that rotatably drives the drum 330.

In addition, the washing machine 300 includes a water supply unit 350 that supplies water to the tub 320, a circulation unit 360 that circulates and drains water accommodated in the tub 320, a detergent supply unit 380 that supplies a detergent, and a water level detection unit 370 that detects a water level of water accommodated in the tub 320.

Other than these, the washing machine 300 may include a detergent feeding container 400 that selectively and directly supplies the detergent into the drum 330.

A feeding port for taking in and out laundry is provided at the center of a front surface of the cabinet 301, and a door 305 for opening and closing the feeding port is provided in the feeding port. The door 305 may be rotatably mounted in the cabinet 301, and enable the feeding port for laundry not to be opened while the washing machine 300 is operated.

A user interface 310 for interacting with a user is provided on an upper portion of the front surface of the cabinet 301.

The user interface 310 will be described in more detail below.

The tub 320 is provided inside the cabinet 301, and includes a tub front member 321 and a tub rear member 322.

An opening for feeding laundry into the drum 330 is provided on a front surface of the tub front member 321, and a diaphragm 321*a* that protrudes forward from the tub 320 is provided along an outer edge of the opening.

A bearing 325 for rotatably fixing a driving motor 341 to be described later and a bearing housing 324 are provided on a rear surface of the tub rear member 322.

The drum 330 is rotatably provided inside the tub 320, and includes a cylindrical drum body 331, a drum front plate 332 provided on a front side of the drum body 331, and a drum rear plate 333 provided on a rear side of the drum body 332.

A through hole 331*a* for allowing water accommodated in the tub 320 to flow into the drum 330 and a lifter 331*b* for lifting laundry upward are provided on an inner surface of the drum body 331.

An opening for taking in and out laundry into the drum 330 is provided on the drum front plate 332, and a flange 334 to which the driving motor 341 for rotating the drum 330 is coupled is provided on the drum rear plate 333.

The drum driving unit 340 includes the driving motor 341 that generates a rotational force for rotating the drum 330 and a shaft 342 that transfers the rotational force generated by the driving motor 341 to the drum 330.

The driving motor 341 includes a stator 341*b* that is fixed on a rear surface of the tub 330 and a rotor 342*a* that rotates through magnetic interaction with the stator 341*b*.

The driving motor 341 may include a BLDG motor capable of easily controlling a rotation speed or a synchronous AC motor.

The shaft 342 is connected at its one end to the rotor 341*a* of the driving motor 341 and connected at the other end thereof to the flange 334 that passes through the rear surface of the tub 320 to be provided on the rear surface of the drum 330. In addition, the shaft 342 is rotatably fixed to the tub 320 by the bearing 325 and the bearing housing 324 which are provided on the rear surface of the tub 320 as described above.

In addition, although not shown, the drum driving unit 340 may further include an inverter circuit (not shown) that generates a driving current for driving the driving motor 341 and a speed control circuit (not shown) that controls a rotation speed of the driving motor 341.

The water supply unit 350 is provided on an upper side of the tub 320, and includes a first water supply module 351 that jets water into the drum 330 and a second water supply module 352 that supplies water through an inner surface of the tub 320.

The first water supply module 351 includes a first water supply pipe 351a, a first water supply valve 351b, and a jet nozzle 351c.

The first water supply pipe 351a supplies water from an external water supply source (not shown), and one end of the first water supply pipe 351a is connected to the external water supply source and the other end thereof is connected to the jet nozzle 351c.

The first water supply valve 351b is provided on the first water supply pipe 351a and opens and closes the first water supply pipe 351a.

The jet nozzle 351c jets water received from the first water supply pipe 351a into the drum 330. In other words, the jet nozzle 351c directly jets water received from the external water supply source into the drum 330.

The jet nozzle 351c may be provided on the inner side of the diaphragm 321a, and as shown in FIG. 12, the jet nozzle 351c jets water from the diaphragm 321a toward the inside of the drum 330.

In addition, the jet nozzle 351c may obliquely jet water toward the inside of the drum 330. Specifically, the jet nozzle 351c jets water toward an inner side surface of the drum 330 as shown in FIG. 13. In this manner, the jet nozzle 351c obliquely jets water, and therefore water is jet to an inner surface of the diaphragm 321a as well as the inner side of the drum 330.

The second water supply module 352 includes a second water supply pipe 352a, a second water supply valve 352b, a connection container 352c, and a connection pipe 352d.

The second water supply pipe 352a supplies water from the external water supply source (not shown), and one end of the second water supply pipe 352a is connected to the external water supply source and the other end thereof is connected to the connection container 352c.

The second water supply valve 352b is provided on the second water supply pipe 352a, and opens and closes the second water supply pipe 352a.

The connection container 352c may be provided on an upper portion of the tub 320. A water pressure of water supplied to the connection container 352c is reduced inside the connection container 352c. In other words, when water supplied from the external water supply source through the second water supply pipe 352a has a high water pressure, the water pressure of the water is reduced while the water passes through the connection container 352c.

In addition, when cold water and hot water are supplied from the external water supply source, the cold water and the hot water may be mixed in the connection container 352c.

The connection pipe 352d supplies water from the connection container 352c into the tub 320, and one end of the connection pipe 352d is connected to the connection container 352c and the other end thereof is connected to the tub 320. In addition, a diameter of the connection pipe 352d may be larger than a diameter of the second water supply pipe 352a so that water accommodated in the connection container 352d is smoothly supplied to the tub 320.

The water supplied into the tub 320 through the connection container 352c and the connection pipe 352d may be supplied along the inner surface of the tub 320. In other words, the water supplied through the connection container 352c and the connection pipe 352d may be supplied starting from a bottom surface of the tub 330 without being directly jetted into the drum 330.

The circulation unit 360 is provided on a lower side of the tub 320, and drains water accommodated in the tub 320 as well as circulating the water accommodated in the tub 320.

The circulation unit 360 includes an outflow pipe 361 that guides water accommodated in the tub 320 to the outside of the tub 320, a water circulation pump 362 that circulates or drains water, an inflow pipe 363 that guides water into the tub 320, and a discharge pipe 364 that guides water to the outside of the washing machine 300.

The outflow pipe 361 is connected at its one end to a lower portion of the tub 320 and connected at the other end thereof to the water circulation pump 362, so that water accommodated in the tub 320 is guided to the water circulation pump 362.

The water circulation pump 362 allows the water flowing out to the outside of the tub 320 through the outflow pipe 361 to selectively flow into the tub 320 or be drained to the outside of the washing machine 300.

Specifically, the water circulation pump 362 circulates water accommodated in the tub 320 while a washing step or a rinsing step is performed, and when the washing step or the rinsing step is terminated, the water circulation pump 362 drains the water accommodated in the tub 320 to the outside of the washing machine 300.

One end of the inflow pipe 363 is connected to the water circulation pump 362 and the other end thereof is connected to the tub 320, so that water flowing out to the outside of the tub 320 through the outflow pipe 361 is guided into the tub 320 again.

One end of the discharge pipe 364 is connected to the water circulation pump 362 and the other end thereof is connected to the outside of the washing machine 300, so that water flowing out to the outside of the tub 320 through the outflow pipe 361 is guided to the outside of the washing machine 300.

The detergent supply unit 380 automatically supplies a detergent or a rinsing agent into the tub 320.

The detergent supply unit 380 includes a detergent storage container 381 that stores a detergent and a rinsing agent, a detergent storage container housing 382 that accommodates the detergent storage container 381, a detergent supply pump 383 that supplies a detergent or a rinsing agent into the tub 320, and a detergent supply pipe 384 that guides a detergent or a rinsing agent to the tub 320.

The detergent storage container housing 382 is fixed and provided inside the cabinet 301 of the washing machine 300. For example, the detergent storage container housing 382 may be provided on a lower side of a feeding port provided on a front surface of the cabinet 301 in order to take in and out laundry.

The detergent storage container 381 may be movably installed inside the detergent storage container housing 382. Thus, when the detergent or the rinsing agent stored in the detergent storage container 381 is all consumed, a user may enable the detergent storage container 381 to protrude from the detergent storage container housing 382, and additionally feed the detergent or the rinsing agent to the detergent storage container 381.

In addition, the inside of the detergent storage container 381 may be partitioned into a detergent storage unit (not shown) that stores a detergent and a rinsing agent storage unit (not shown) that stores a rinsing agent.

The detergent supply pump 384 is provided on a rear surface of the detergent storage container housing 182, and may include a detergent pump (not shown) for feeding the detergent stored in the detergent storage space (not shown) into the tub 330 and a rinsing agent pump (not shown) for feeding the rinsing agent stored in the rinsing agent storage unit (not shown) into the tub 330.

The detergent supply pipe 384 allows the detergent or the rinsing agent to be supplied into the tub 320, and one end of the detergent supply pipe 384 is connected to the detergent supply pump 383 and the other end thereof is connected to the outflow pipe 361.

Specifically, the detergent or the rinsing agent is fed to the circulation unit 360 through the detergent supply pipe 384, and the detergent or the rinsing agent fed into the circulation unit 360 is fed into the tub 320 through the water circulation pump 362.

However, the other end of the detergent supply pipe 384 is not limited to be connected to the outflow pipe 361 of the circulation unit 360.

For example, the other end of the detergent supply pipe 384 may be connected to the connection container 353 of the water supply unit 350, and in this case, the detergent or the rinsing agent may be supplied into the tub 330 together with water at the time of water supply.

As another example, the other end of the detergent supply pipe 384 may be directly connected to the tub 330, so that the detergent supply unit 380 may directly supply the detergent or the rinsing agent into the tub 330.

In FIG. 11, the detergent supply unit 380 is provided on a front lower portion of the washing machine 300, but the present invention is not limited thereto. For example, the detergent supply unit 380 may be provided on an upper portion of the washing machine or on a rear side of the washing machine 300.

In addition, the washing machine 300 shown in FIGS. 10 and 11 includes the detergent supply unit 380 that automatically supplies the detergent into the drum, but the present invention is not limited thereto. For example, when a user feeds a dose of detergent into an openable drawer-type detergent container, the detergent in the detergent container may be supplied into the drum during water supply.

Even in a case of including the drawer-type detergent container, when the user deactivates detergent automatic supply, the washing machine performs a detergent dissolution operation in order to dissolve the detergent directly fed into the drum 330 by the user.

In addition, when including the drawer-type detergent container, the washing machine may select any one of detergent supply through the detergent container and detergent direct supply through the detergent feeding container.

In other words, when the washing machine 300 includes the detergent supply unit 380, detergent supply through the detergent supply unit 380 is performed by default and detergent direct supply through the detergent feeding container 400 is possible by a user's selection. In addition, when the washing machine does not include the detergent supply unit 380, the user may select any one of detergent supply through the detergent container and detergent direct supply through the detergent feeding container 400.

The water level detection unit 370 includes a water level sensor 371 that detects a water level of water accommodated in the tub 320 and a water level detection pipe 372 that is connected to the lower portion of the tub 320.

One end of the water level detection pipe 372 is connected to the lower portion of the tub 320, and the other end thereof is connected to the water level sensor 371. When water is supplied to the tub 320, the water level detection pipe 372 has the same water level as that of the inside of the tub 320.

The water level sensor 371 is provided on one end of the water level detection pipe 372, and detects a pressure inside the water level detection pipe 372 to detect a water level of the tub 320.

Specifically, when the water level inside the tub 320 becomes higher, the water level of the water level detection pipe 372 also becomes higher, and when the water level of the water level detection pipe 372 becomes higher, the pressure inside the water level detection pipe 372 is increased. The water level sensor 371 may calculate the water level inside the tub 320 by detecting the pressure inside the water level detection pipe 372.

Figure 14:
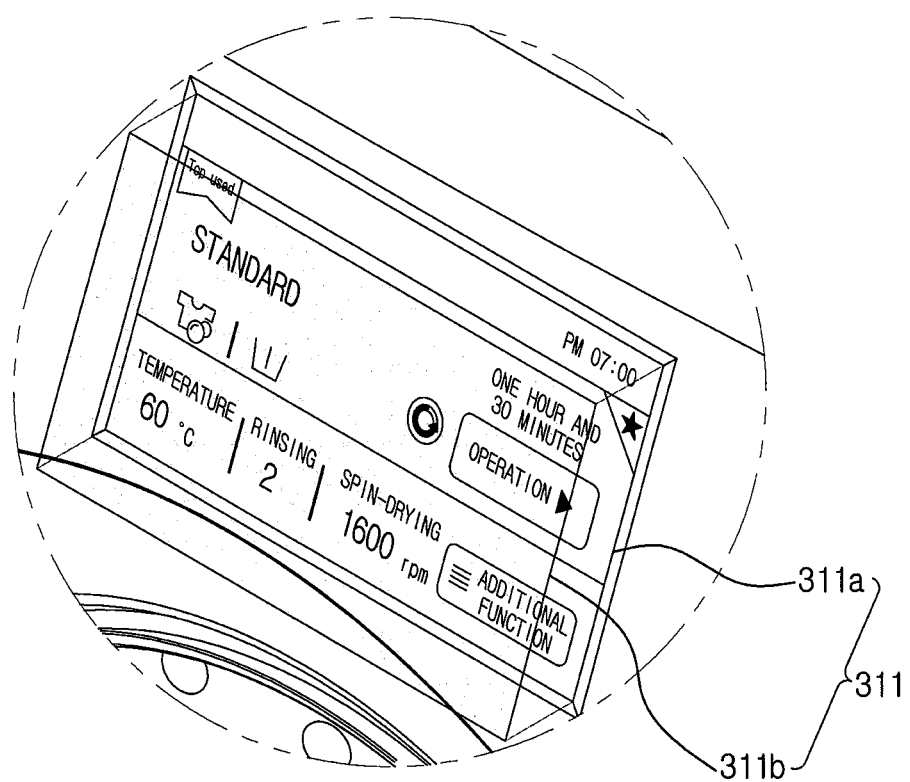
FIG. 14 illustrates a user interface included in a washing machine in accordance with another embodiment of the present invention.

FIG. 14 illustrates a user interface included in a washing machine in accordance with another embodiment of the present invention.

Referring to FIG. 14, the user interface 310 includes a plurality of buttons 312 that receive control commands from a user and a touch screen 311 that receives the control commands from the user and displays operation information according to the control commands.

The plurality of buttons 312 may include a power button for turning ON and OFF power of the washing machine 300, a washing start button for starting operations of the washing machine 300, and the like.

The plurality of buttons 312 may adopt a micro button for detecting pressurization by a user, a membrane button, a touch detection button for detecting touch by a user, or the like.

The touch screen 311 includes a display panel 311*a* that visually outputs setting information, operation information, and the like of the washing machine 300 and a touch panel 311*b* that is provided on the display panel 311*a* to detect a touch contact with the user's body.

The touch panel 311*b* may adopt a capacitive touch panel that can acquire position information of a user's contact as well as detecting the user's contact, a resistive touch panel, or the like. In addition, the display panel 311*a* may adopt a liquid crystal display (LCD) panel, a light emitting diode (LED) panel, an organic light emitting diode (OLED) panel, or the like.

The touch screen 311 displays control commands that can be input by a user through the display panel 311*a*, and detects touch position information through the touch panel 311*b* when the user touches the touch screen 311 in accordance with the displayed control commands.

The washing machine 300 may receive setting information related to operations of the washing machine 300 such as a washing course, a temperature of water, the number of times of rinsing step, strength of spin-drying step, and the like, and receive control commands related to operations of the washing machine 300 such as a washing start command, a washing stop command, and the like.

Specifically, the washing machine 300 recognizes the setting information and control commands which are input by a user based on the position information of the control command displayed on the touch screen 311 and the touch position information detected by the touch screen 311.

A specific process in which the washing machine 300 receives the setting information and the control commands through the touch screen 311 will be described in detail below.

Figure 15:
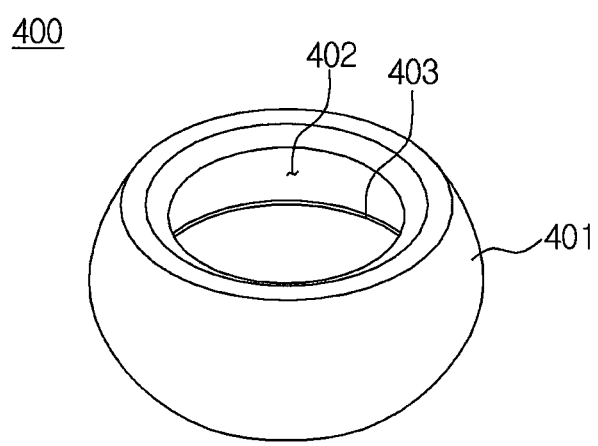
FIG. 15 illustrates a detergent feeding container included in a washing machine in accordance with another embodiment of the present invention.

FIG. 15 illustrates a detergent feeding container included in a washing machine in accordance with another embodiment of the present invention.

Referring to FIG. 15, the detergent feeding container 400 includes a feeding container main body 401 that receives a detergent, and a detergent feeding port 402 for feeding a detergent into the feeding container main body 401 is provided on an upper portion of the feeding container main body 401.

The detergent feeding container 400 is positioned in the drum 330 together with laundry even at the time of a rinsing step and a spin-drying step as well as a washing step, and therefore the feeding container main body 401 may have a streamlined shape in order to prevent the laundry inside the drum 330 from being damaged. In addition, the detergent feeding port 402 through which a detergent is fed by a user and the detergent flows out at the time of washing step is provided on the upper portion of the feeding container main body 401.

In addition, a detergent capacity scale 403 for displaying the capacity of the detergent accommodated in the feeding container main body 401 may be provided inside the feeding container main body 401.

When a user desires to feed a separate detergent other than the detergent stored in the detergent supply unit 380, there may be difficulties in feeding of the detergent. In other words, since a large amount of detergent has been already stored in the detergent supply unit 380, it is difficult to feed other detergents through the detergent supply unit.

In this case, the user may accessarily use the detergent feeding container 400. In other words, the user may put the detergent in the detergent feeding container 400 and directly feed the detergent into the drum 330.

When the user feeds the detergent feeding container 400 with the detergent accommodated therein into the drum 330 together with laundry and then operates the washing machine 300, the detergent accommodated in the detergent feeding container 400 flows out to the drum 330.

The washing machine 300 automatically supplies the detergent through the detergent supply unit 380 by default, but a user may directly feed the detergent into the drum 330 through the detergent feeding container 400 according to the user's selection.

The user may deactivate detergent automatic supply, and when the detergent automatic supply is deactivated, the washing machine 1 does not operate the detergent supply unit 380.

Figure 16:
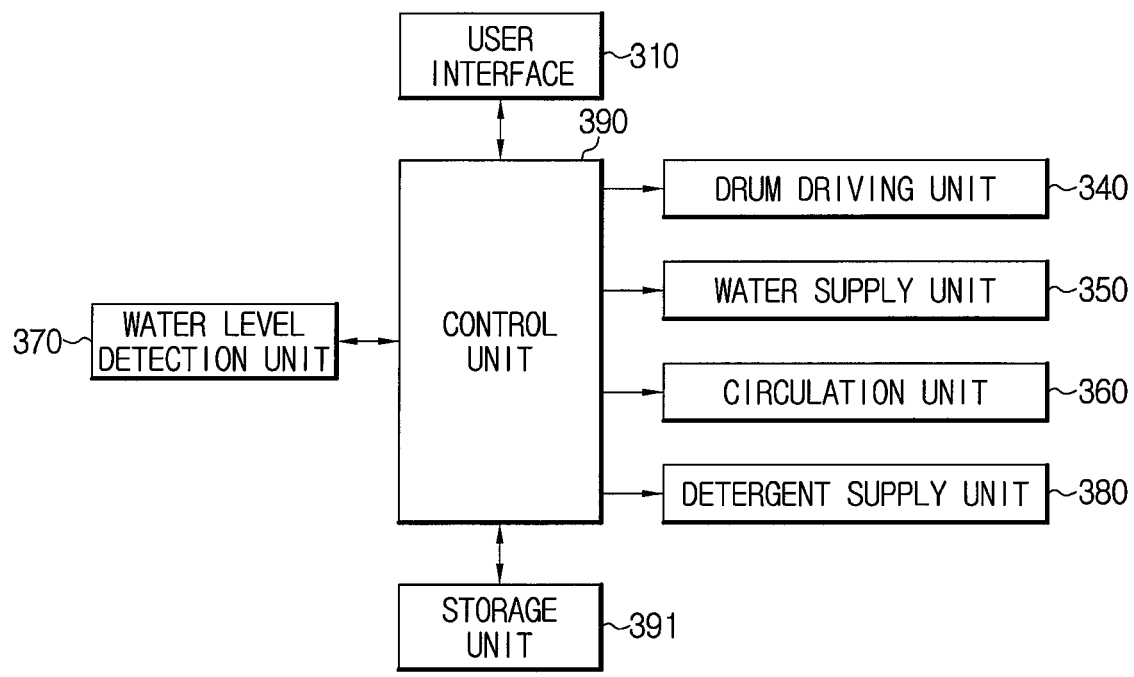
FIG. 16 illustrates a control flow of a washing machine in accordance with another embodiment of the present invention.

FIG. 16 illustrates a control flow of a washing machine in accordance with another embodiment of the present invention.

Referring to FIG. 16, the washing machine 300 further includes a control unit 390 and a storage unit 391 in addition to the above-described drum driving unit 340, water supply unit 350, circulation unit 360, detergent supply unit 380, and water level detection unit 370.

The storage unit 391 stores a program and data for controlling the washing machine 300.

The storage unit 391 may include a non-volatile memory such as a magnetic disc or a solid state disk for permanently storing programs and data for controlling operations of the washing machine 300 and a volatile memory such as a D-RAM or an S-RAM for temporarily storing temporary data generated in a process of controlling the operations of the washing machine 300.

The control unit 390 controls operations of the washing machine 300 according to control commands of the user input through the user interface 310, a water level output by the water level detection unit 370, and data stored in the storage unit 430.

Specifically, when a user feeds laundry into the drum 330 and starts a washing start command, the control unit 390 controls the water supply unit 350 so that water is fed into the tub 320. In addition, the control unit 390 controls the detergent supply unit 380 and the circulation unit 360 so that the detergent is supplied into the tub 320.

Next, in order to perform a washing step, the control unit 390 controls the water supply unit 350 to enable water to be supplied into the tub 320, controls the detergent supply unit 380 to enable a detergent to be supplied to the tub 320, controls the drum driving unit 340 to enable the drum 330 to be rotated, and controls the circulation unit 360 to enable water accommodated in the tub 320 to be discharged.

In addition, when the washing step is completed, the control unit 390 controls the water supply unit 350, the detergent supply unit 380, the drum driving unit 340, and the circulation unit 360 in order to perform a rinsing step.

In addition, when the rinsing step is completed, the control unit 390 controls the drum driving unit 340 to enable the drum to be rotated at a high speed in order to perform a spin-drying step.

In this manner, the control unit 390 controls overall operations of the washing machine 300 which will be described below.

As above, the configuration of the washing machine 300 according to another embodiment of the present invention has been described.

Hereinafter, operations of the washing machine 300 according to another embodiment of the present invention will be described.

Figure 17:
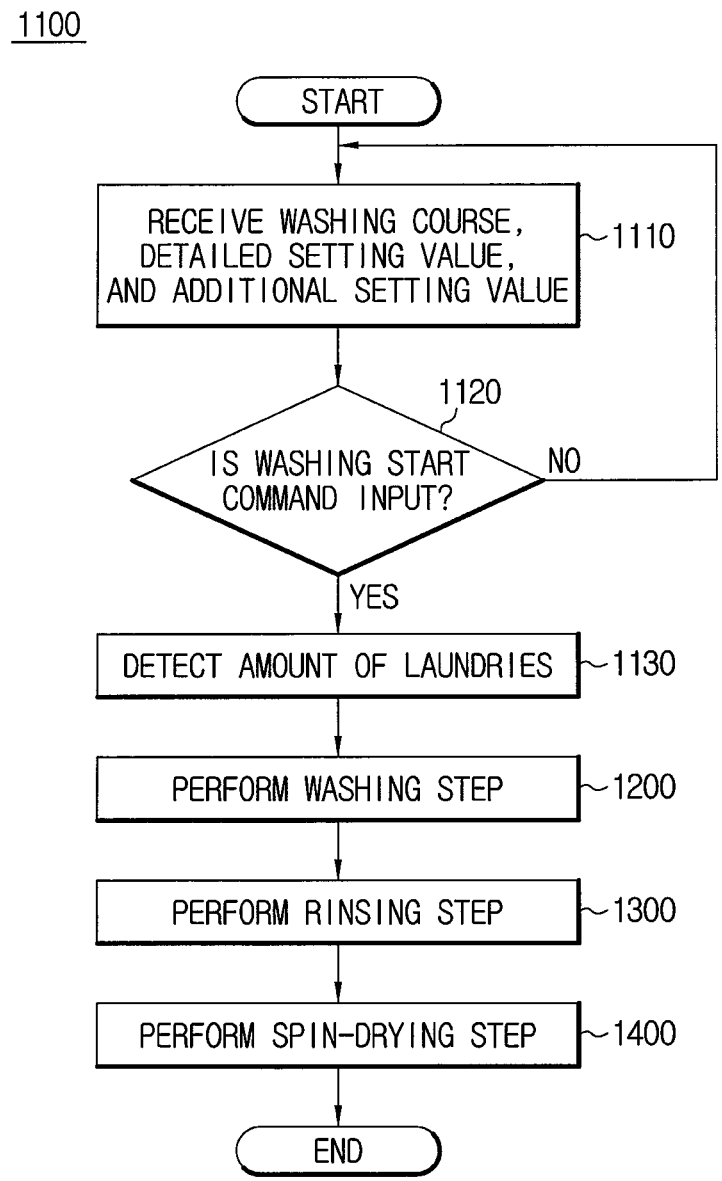
FIG. 17 illustrates an operation of a washing machine in accordance with another embodiment of the present invention.

FIG. 17 illustrates an operation of a washing machine in accordance with another embodiment of the present invention, and FIGS. 18 to 21 illustrate an example of a washing setting screen displayed by a washing machine in accordance with another embodiment of the present invention.

In operations of the washing machine 300, the washing machine 300 performs at least one of the washing step, the rinsing step, and the spin-drying step in accordance with control commands of a user.

The washing machine 300 separates foreign substances from laundry using a chemical action by a detergent and a mechanical action by rotation of the drum 330 during the washing step, and removes the foreign substances separated from the laundry and the detergent using clean water and rotation of the drum 330 during the rinsing step. In addition, the washing machine 300 removes water from the laundry using rotation of the drum 330 during the spin-drying step.

Referring to FIGS. 17 to 21, operation 1100 of the washing machine 300, particularly, an operation in which the washing machine 300 receives a washing course and a detailed setting value from a user will be described in detail.

In operation 1110, the washing machine 300 receives a washing course, a detailed setting value, and an additional setting value from a user.

For example, the washing machine 300 may receive the washing course and the detailed setting value through the above-described touch screen 311.

The washing course means a washing method that is stored in advance in order to exhibit optimal washing power in accordance with the type and material of the laundry. Such a washing course may include a standard course, a wool course, a blanket course, an underwear course, and the like.

The detailed setting value means a variable that can be changed by a user other than the washing course such as a temperature of water, rinsing frequency, strength of spin-drying, and the like.

Figure 18:
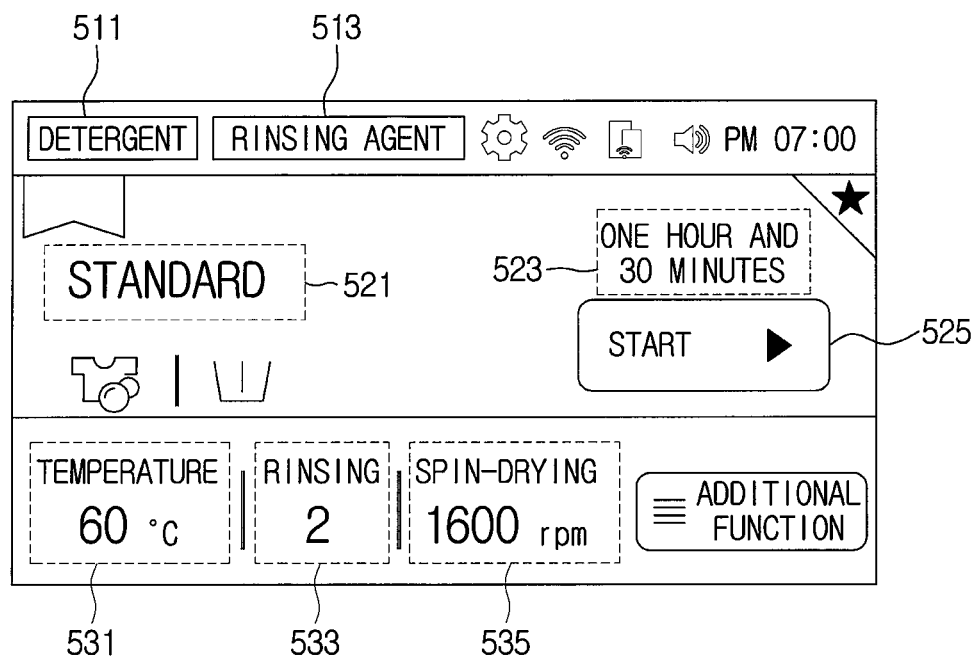
FIGS. 18 to 21 illustrate an example of a washing setting screen displayed by a washing machine in accordance with another embodiment of the present invention.

The washing machine 300 may display a washing setting screen 500 shown in FIG. 18 on the touch screen 311 so that the user can change the washing course and the detailed setting value.

The washing setting screen 500 may include a detergent supply display region 511, a rinsing agent supply display region 513, a washing course setting region 521, a washing time display region 523, a washing start command region 525, a washing temperature setting region 531, a rinsing frequency setting region 533, and a spin-drying strength setting region 535.

The detergent supply display region 511 displays whether the washing machine 300 supplies the detergent through the detergent supply unit 380.

For example, when "detergent" is displayed on the detergent supply display region 511, the washing machine 300 automatically supplies the detergent, and when there is no sign on the detergent supply display region 511, the washing machine 300 does not supply the detergent.

The rinsing agent supply display region 513 displays whether the washing machine 300 supplies the rinsing agent through the detergent supply unit 380.

For example, when "rinsing agent" is displayed on the rinsing agent supply display region 513, the washing machine 300 automatically supplies the rinsing agent, and when there is no sign on the rinsing agent supply display region 513, the washing machine 300 does not supply the rinsing agent.

The washing course setting region 521 receives a washing course from a user and displays the washing course selected by the user.

For example, when the user touches the washing course setting region 521, the washing machine 300 may display the washing course that can be selected by the user, and receive selection of the washing course from the user. In addition, when the user selects the washing course, the washing machine 300 may display the selected washing course on the selected washing course setting region 521.

The washing time display region 523 displays a washing time which can be predicted until washing is completed before operation of the washing machine 300. The washing time may be changed according to the washing course, rinsing frequency, and the like which are selected by the user.

The washing start command region 525 receives a washing start command from the user. The user may input the washing course and the detailed setting value, and then input the washing start command through the washing start command region 525. When the washing start command is input, the washing machine 300 starts an operation for washing laundry accommodated in the drum 330.

Each of the washing temperature setting region 531, the rinsing frequency setting region 533, and the spin-drying strength setting region 535 receives a washing temperature, a rinsing frequency, and strength of spin-drying from the user, and displays the washing temperature, the rinsing frequency, and the strength of spin-drying which are input by the user.

Figure 19:
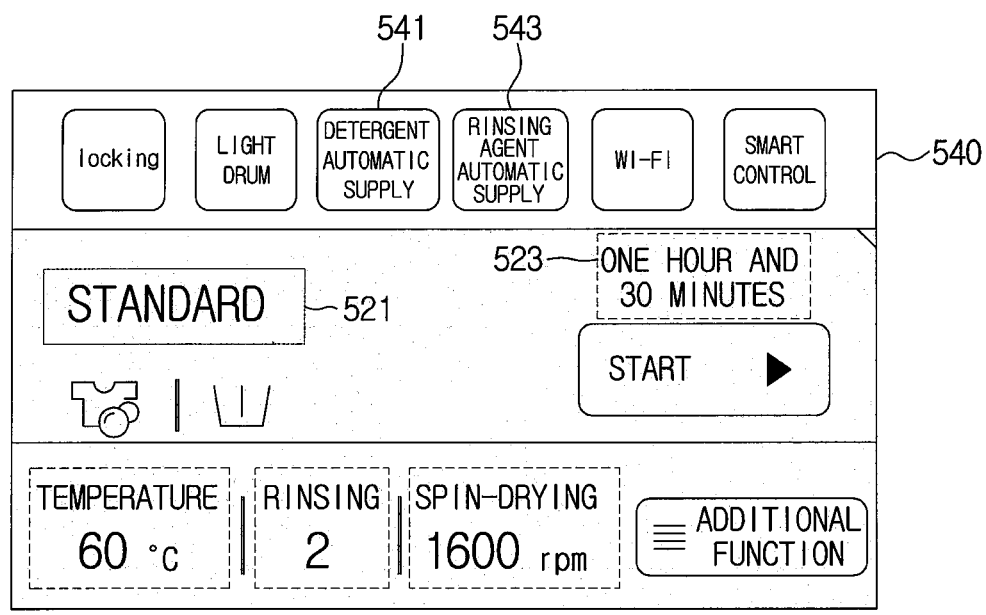

In addition, when the user touches an upper end of the washing setting screen 500, the washing machine 300 displays an additional setting screen 540 for inputting additional setting values other than the above-described detailed setting. For example, the additional setting screen 540 may be additionally displayed on the washing setting screen 500 as shown in FIG. 19.

The additional setting screen 540 may include a detergent supply setting region 541 for receiving whether detergent automatic supply is activated from the user and a rinsing agent supply setting region 543 for receiving whether rinsing agent automatic supply is activated from the user.

As described above, the user may allow the washing machine 300 to automatically supply a detergent, or directly feed the detergent into the drum 330 using the detergent feeding container 400. In order for the washing machine 300 to automatically supply the detergent, the user may activate detergent automatic supply. In addition, in order to directly feed the detergent into the drum 330, the user may deactivate detergent automatic supply.

The washing machine 300 may toggle whether detergent automatic supply is activated in accordance with the user's manipulation.

For example, when the user touches the detergent supply setting region 541 in a case in which detergent automatic supply is activated, the washing machine 300 deactivates detergent automatic supply. In addition, when the user touches the detergent supply setting region 541 in a case in which detergent automatic supply is deactivated, the washing machine 300 activates detergent automatic supply.

In other words, the washing machine 300 alternately sets activation and deactivation of detergent automatic supply in accordance with the user's manipulation (touch on detergent supply setting region).

In addition, the washing machine 300 toggles whether rinsing agent automatic supply is activated in accordance with the user's manipulation.

For example, when the user touches the rinsing agent supply setting region 543 in a case in which rinsing agent automatic supply is activated, the washing machine 300 deactivates rinsing agent automatic supply. In addition, when the user touches the rinsing agent supply setting region 543 in a case in which rinsing agent automatic supply is deactivated, the washing machine 300 activates rinsing agent automatic supply.

In other words, the washing machine 300 alternatively sets activation and deactivation of rinsing agent automatic supply in accordance with the user's manipulation (touch on rinsing agent supply setting region).

When the washing machine 300 displays the additional setting screen 540 and then the user does not input a control command for a predetermined waiting time or the user touches a region other than the additional setting screen 540, the washing machine 300 removes the additional setting screen 540 and displays the washing setting screen 500.

Figure 20:
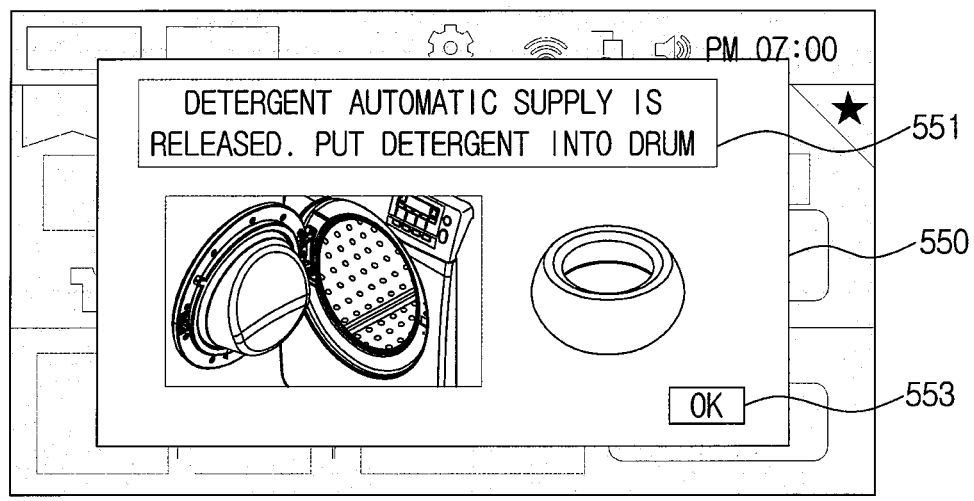

In addition, when detergent automatic supply is deactivated, the washing machine 300 removes the additional setting screen 540 and then immediately displays a detergent feeding guidance screen 550 shown in FIG. 20.

The detergent feeding guidance screen 550 may include a message display region 551 that displays a message indicating that detergent automatic supply is deactivated and a message for requesting to directly feed the detergent into the drum.

In addition, the detergent feeding guidance screen 550 may include a detergent feeding check region 553 for transmitting detergent feeding to the washing machine 300 after the user directly feeds the detergent into the drum 330. In other words, when the user touches the detergent feeding check region 553, the washing machine 300 may recognize that the user directly feeds the detergent into the drum 330.

Figure 21:
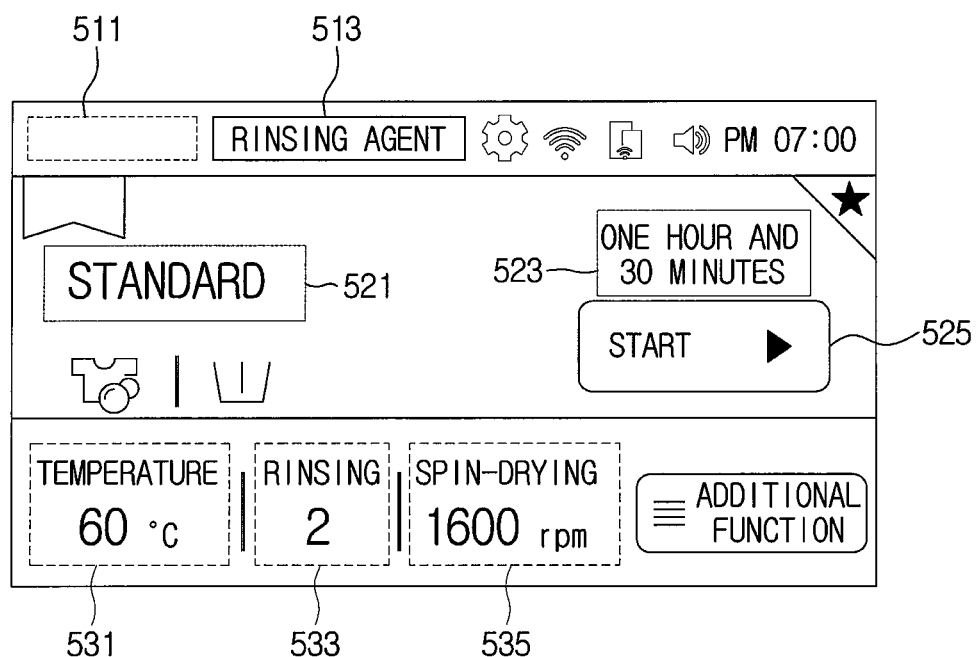

When the user deactivates detergent automatic supply, the washing machine 300 may display the washing setting screen 500 as shown in FIG. 21.

Specifically, the washing machine 300 may remove a mark displayed on the detergent supply display region 511 of the washing setting screen 500 as shown in FIG. 21 in order to display that detergent automatic supply is deactivated.

When the mark displayed on the detergent supply display region 511 is removed, the user may recognize that detergent automatic supply is deactivated.

The washing machine 300 may receive the washing course, the detailed setting value, and the additional setting value from the user in the above-described method.

In operation 1120, after receiving the washing course, the detailed setting value, and the additional setting value, the washing machine 300 determines whether the washing start command is input from the user.

For example, when the user presses the washing start button among the plurality of buttons 312 or touches the washing start command region 525 displayed on the touch screen 311, the washing machine 300 may determine that the washing start command is input.

When the washing start command is not input (NO of 1120), the washing machine 300 additionally receives the washing course, the detailed setting value, and the additional setting value from the user.

In operation 1130, when the washing start command is input (YES of 1120), the washing machine 300 detects an amount of laundry accommodated in the drum 330.

The washing machine 300 may detect the amount of laundry in various methods.

For example, the drum 330 may be rotated at a predetermined rotation speed, and the amount of laundry may be detected through a driving current value supplied to the driving motor 341 that rotates the drum 330. As another example, the drum 330 may be accelerated from a first rotation speed to a second rotation speed, and the amount of laundry may be detected using a sum of the driving current values supplied to the driving motor 341.

In addition, the washing machine 300 may additionally install a component that can directly detect a weight of the drum 330, and detect the amount of laundry from the detected weight of the drum 330.

When the amount of laundry is detected, the washing machine 300 may sequentially perform a washing step 1200, a rinsing step 1300, and a spin-drying step 1400.

The washing step may include a washing water supply operation, a washing operation, and an intermediate spin-drying operation, and the rinsing step may include a rinsing water supply operation, a rinsing operation, and an intermediate spin-drying operation.

In addition, as described above, one or two steps of the washing step 1200, the rinsing step 1300, and the spin-drying step 1400 may be performed in accordance with the user's selection.

For example, when the user commands only the washing step 1200 to be performed through the user interface 310, the washing machine 300 may perform only the washing step 1200 and then complete the corresponding step, and when the user commands only the rinsing step 1300 and the spin-drying step 1400 to be performed through the user interface 310, the washing machine 300 may perform the rinsing step 1300 and the spin-drying step 1400 and then complete the corresponding steps.

The washing step 1200 and the rinsing step 1300 will be described in detail below.

Figure 22:
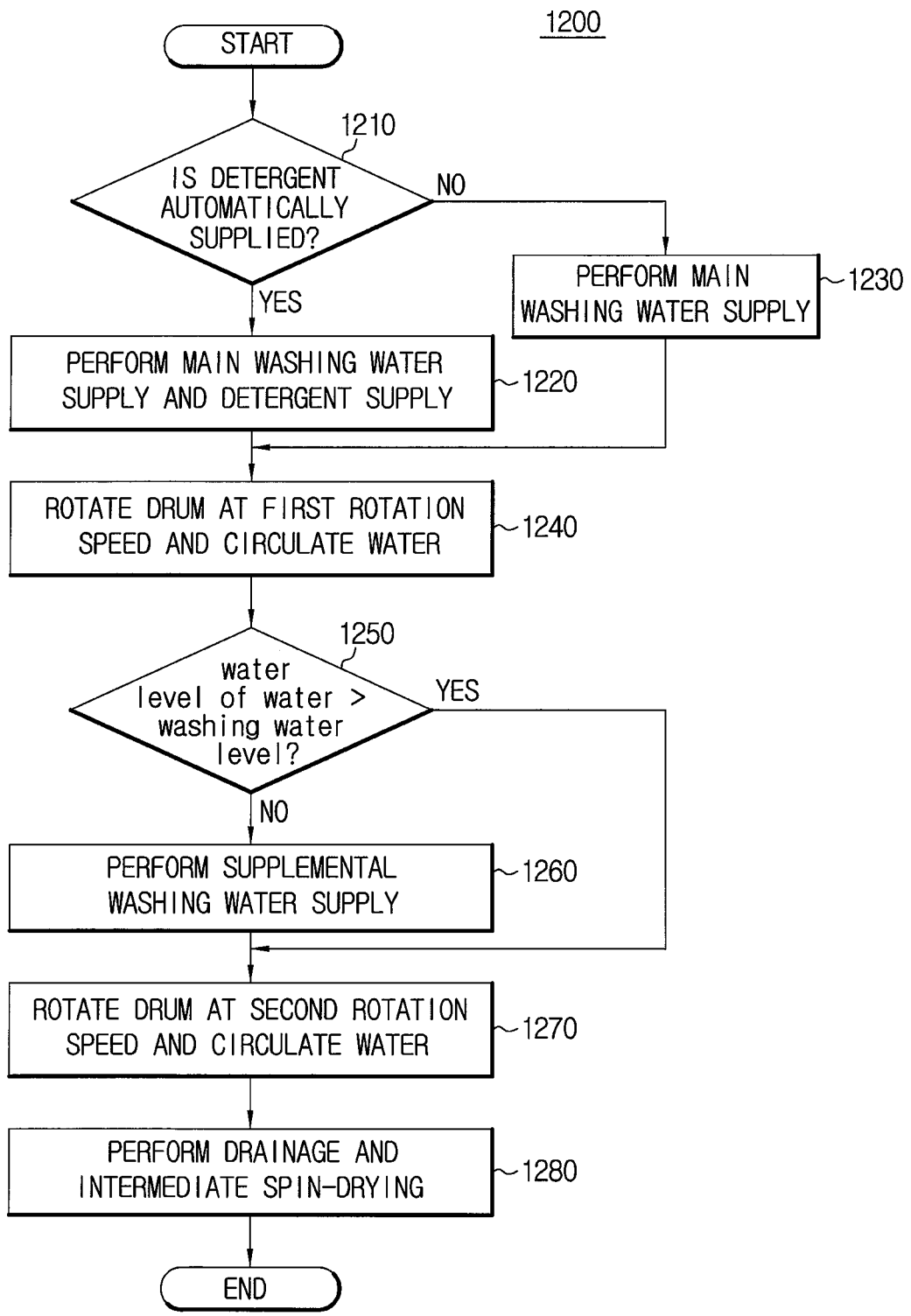
FIG. 22 illustrates an example of a washing step performed by a washing machine in accordance with another embodiment of the present invention.
Figure 23:
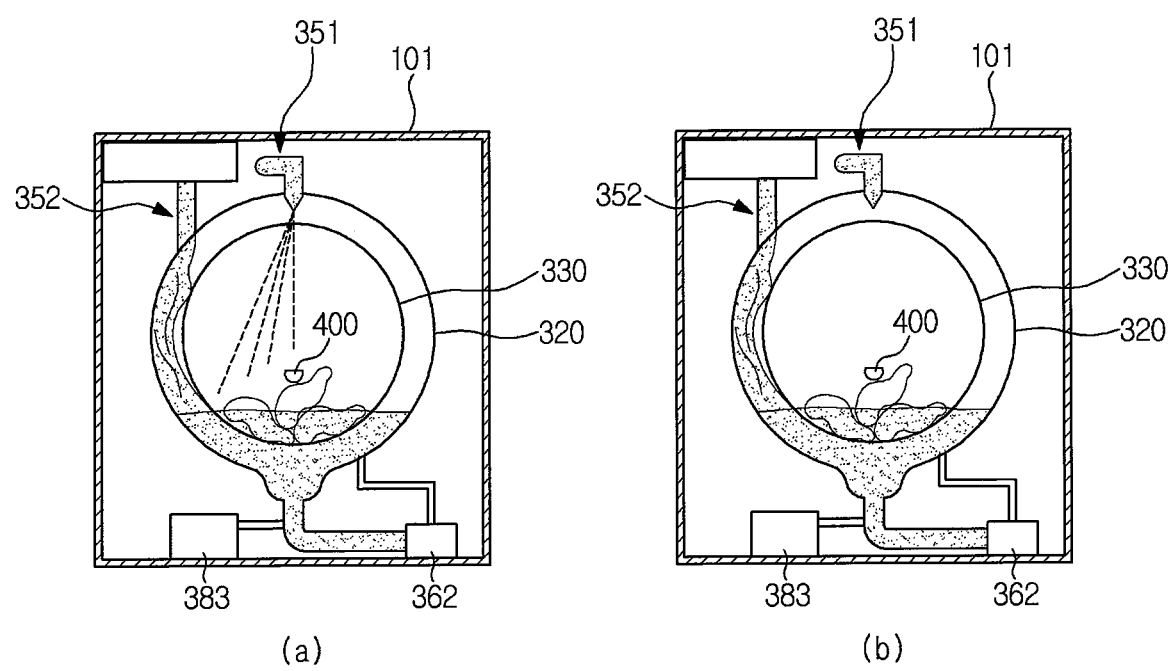
FIG. 23 illustrates a washing water supply operation of a washing machine in accordance with another embodiment of the present invention.

FIG. 22 illustrates an example of a washing step performed by a washing machine in accordance with another embodiment of the present invention, and FIG. 23 illustrates a washing water supply operation of a washing machine in accordance with another embodiment of the present invention.

Referring to FIGS. 22 and 23, the washing step 1200 and washing water supply operation of the washing machine 300 will be described.

In operation 1210, when the washing step 1200 starts, the washing machine 300 determines whether detergent automatic supply is activated.

As described above, the user may select whether detergent automatic supply is activated. Specifically, the user may select whether detergent automatic supply is activated using the washing setting screen (see 500 of FIGS. 18 and 19) displayed on the touch screen (see 311 of FIG. 14).

In operation 1220, when detergent automatic supply is activated (YES of 1210), the washing machine 300 performs a main washing water supply operation and a detergent supply operation.

Specifically, the washing machine 300 performs water supply through the first water supply module 351 and water supply through the second water supply module 352 as shown in (a) of FIG. 23 during a washing water supply time calculated according to an amount of laundry. For example, the washing machine 300 may open the first water supply valve (see 351*b* of FIG. 11) and the second water supply valve (see 352*b* of FIG. 11) during the washing water supply time, and close the first water supply valve (see 351*b* of FIG. 11) and the second water supply valve (see 352*b* of FIG. 11) when the washing water supply time has elapsed.

In this manner, by feeding water through the first water supply module 351 and the second water supply module 352, water may be rapidly fed into the tub 320.

In addition, the washing machine 300 supplies a detergent during the main washing water supply operation. Specifically, the washing machine 300 may allow the detergent to be fed into the tub 320 by activating the detergent supply pump 383 during a detergent supply time calculated according to the amount of laundry.

In operation 1230, when detergent automatic supply is deactivated (NO of 1210), the washing machine 300 performs the main washing water supply operation.

The washing machine 300 performs water supply through the first water supply module 351 and the second water supply module 352 as shown in (a) of FIG. 23 during a washing water supply time calculated according to the amount of laundry.

When detergent automatic supply is deactivated, the user may directly feed the detergent into the drum 330 using the detergent feeding container 400. In this manner, when the user puts the detergent in the detergent feeding container 400 and feeds the detergent feeding container 400 into the drum 330, the washing machine 300 may allow the detergent accommodated in the detergent feeding container 400 to be smoothly dissolved in water by jetting water into the drum 330 through the first water supply module 351.

Specifically, the water jetted through the first water supply module 351 hits the detergent accommodated in the detergent feeding container 400, and therefore the detergent may be separated from the detergent feeding container 400. In addition, the detergent separated from the detergent feeding container 400 is dissolved faster in water compared to a case in which the detergent is accommodated in the detergent feeding container 400.

In this manner, by feeding water through the first water supply module 351 and the second water supply module 352, the washing machine 300 may rapidly supply water into the tub 320, and allow the detergent accommodated in the detergent feeding container 400 to be smoothly dissolved in water.

In operation 1240, when the washing water supply time has elapsed, the washing machine 300 rotates the drum 330 at a predetermined first rotation speed, and circulates water accommodated in the tub 320.

Specifically, in order to dissolve the detergent, the washing machine 300 controls the drum driving unit 340 so that the drum 330 is rotated at the first rotation speed during the washing water supply time, and activates the water circulation pump 362 so that water is circulated inside and outside the tub 320.

For example, the washing machine 300 may rotate the drum 330 at a speed of 40 rpm or less. In addition, during the washing water supply time, the washing machine 300 may repeatedly perform processes of rotating the drum 330 in the clockwise direction for 4 to 5 seconds and then stopping the drum 330 for 4 to 5 seconds, and rotating the drum 330 in the counterclockwise direction for 4 to 5 seconds and then stopping the drum 330 for 4 to 5 seconds.

In this manner, by rotating the drum 330 at a low speed, the detergent may be smoothly dissolved in water, and the detergent may be prevented from being agglomerated.

In operation 1250, when the main washing water supply operation is completed, the washing machine 300 determines whether a water level of water accommodated in the tub 320 is a predetermined washing water level or higher.

The above-described main washing water supply operation is performed for a predetermined time according to the amount of laundry. As a result, the water level of water after termination of the main washing water supply operation may be changed according to a degree in which laundry absorbs water. For example, when the laundry absorbs a large amount of water, the water level of water accommodated in the tub 320 may not reach the washing water level.

The washing machine 300 may determine whether the water level of water accommodated in the tub 320 is the washing water level or higher in order to exhibit optimal washing power.

In operation 1260, when the water level of water accommodated in the tub 320 is less than the washing water level (NO of 1250), the washing machine 300 performs a supplemental washing water supply operation.

The washing machine 300 performs water supply through the second water supply module 352 as shown in (b) of FIG. 23 during the supplemental washing water supply operation.

When water supply is performed through the second water supply module 352 as described above, water rises from the bottom surface of the tub 320, and therefore the washing machine 300 may accurately detect the water level inside the tub 320. For this reason, the supplemental washing water supply operation may be performed through the second water supply module 352.

While the supplemental washing water supply operation is performed, the washing machine 300 detects the water level of water accommodated in the tub 320, and when the detected water level of water reaches the washing water level, the washing machine 300 completes the supplemental washing water supply operation.

In operation 1270, when the supplemental washing water supply operation is completed, the washing machine 300 rotates the drum 330 at a predetermined second rotation speed, and circulates water.

Specifically, the washing machine 300 controls the drum driving unit 340 so as to rotate the drum 330 at the second rotation speed during a washing step time so that washing is performed on laundry during the washing step time, and activates the water circulation pump 362 of the circulation unit 360 so that water accommodated in the tub 320 is circulated.

For example, the washing machine 300 may rotate the drum 330 at the speed of 45 to 60 rpm in the clockwise and counterclockwise directions. In addition, during the washing step time, the washing machine 300 may repeatedly perform processes of rotating the drum 330 for approximately 20 seconds (ON time) in the clockwise direction and then stopping the drum 330 for 4 to 5 seconds (OFF time), and rotating the drum 330 for approximately 20 seconds (ON time) in the counterclockwise direction and then stopping the drum 330 for 4 to 5 seconds (OFF time).

In operation 1280, when the washing step time has elapsed, the washing machine 300 performs a drainage operation and an intermediate spin-drying operation.

Specifically, the washing machine 300 activates the water circulation pump 362 so that water accommodated in the tub 320 is discharged to the outside of the washing machine 300, and rotates the drum 330 at a high speed so that the laundry and water are separated from each other by a centrifugal force.

For example, the washing machine 300 may rotate the drum 330 in any one of clockwise and counterclockwise directions at a speed of several hundreds to thousands of rpm. In this manner, water of the laundry is separated from the laundry by the centrifugal force while the drum 330 is being rotated.

In this manner, the washing machine 300 jets water into the drum 330 using the first water supply module 351 in the washing water supply operation of the washing step 1200, and therefore the washing machine 300 may smoothly dissolve the detergent in water even when the user feeds the detergent using the detergent feeding container 400.

Figure 24:
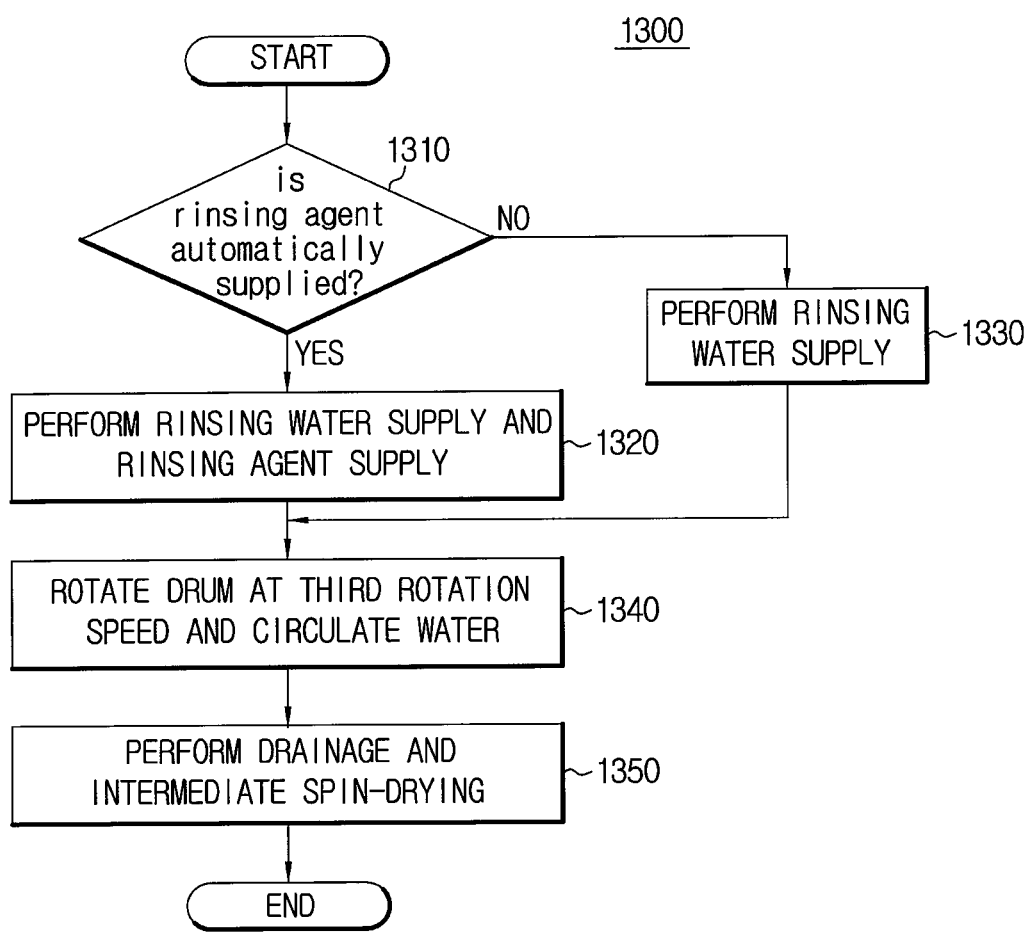
FIG. 24 illustrates an example of a rinsing step performed by a washing machine in accordance with another embodiment of the present invention.
Figure 25:
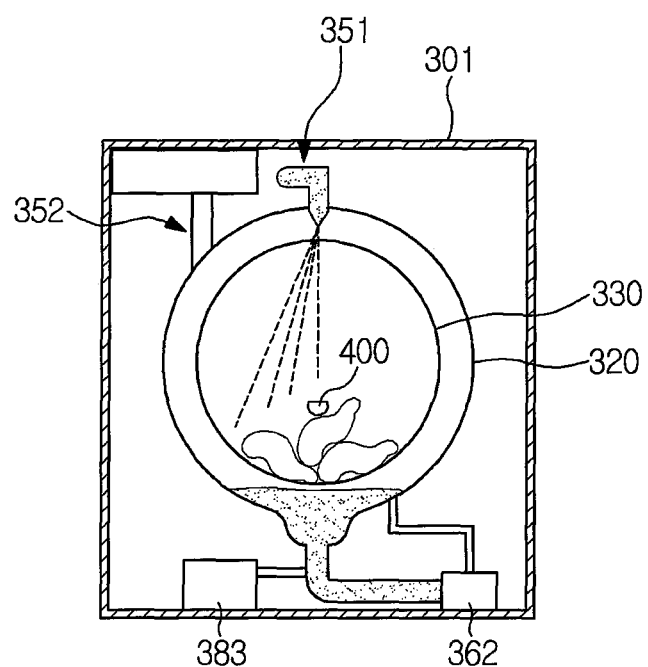
FIG. 25 illustrates a rinsing water supply operation of a washing machine in accordance with another embodiment of the present invention.

FIG. 24 illustrates an example of a rinsing step performed by a washing machine in accordance with another embodiment of the present invention, and FIG. 25 illustrates a rinsing water supply operation of a washing machine in accordance with another embodiment of the present invention.

Referring to FIGS. 24 and 25, the rinsing step 1300 and the rinsing water supply operation of the washing machine 300 will be described.

In operation 1310, when the rinsing step 1300 starts, the washing machine 300 determines whether a rinsing agent automatic supply is activated.

As described above, the user may select whether rinsing agent automatic supply is activated. Specifically, the user may select whether rinsing agent automatic supply is activated using the washing setting screen (see 500 of FIGS. 18 and 19) displayed on the touch screen (see 311 of FIG. 14).

In operation 1320, when rinsing agent automatic supply is activated (YES OF 1310), the washing machine 300 performs a rinsing water supply operation and a rinsing agent supply operation.

Specifically, the washing machine 300 performs water supply through the first water supply module 351 as shown in FIG. 25 during a rinsing water supply time calculated according to the amount of laundry. For example, the washing machine 300 may open the first water supply valve (see 351*b* of FIG. 11) during the rinsing water supply time, and when the rinsing water supply time has elapsed, the washing machine 300 may close the first water supply valve (see 351*b* of FIG. 11).

By jetting water into the drum 330 through the first water supply module 351, the washing machine 300 may improve rinsing efficiency.

When jetting water into the drum 330 through the first water supply module 351, the jetted water passes through the laundry and is stored in the tub 320. In this manner, while water passes through the laundry, the foreign substances and detergent attached to the laundry may be separated from the laundry. In other words, when jetting water into the drum 330 through the first water supply module 351, the washing machine 300 may obtain a rinsing effect through rinsing water supply.

In operation 1320, when rinsing agent automatic supply is deactivated (NO of 1310), the washing machine 300 performs the rinsing water supply operation.

In operation 1340, when the rinsing water supply time has elapsed, the washing machine 300 rotates the drum 330 at a predetermined third rotation speed, and circulates water accommodated in the tub 320.

Specifically, the washing machine 300 controls the drum driving unit 340 so as to rotate the drum 330 at the third rotation speed during a rinsing step time so that rinsing is performed on the laundry, and activates the water circulation pump 362 of the circulation unit 360 so that water accommodated in the tub 320 is circulated.

For example, the washing machine 300 may rotate the drum 330 in the clockwise and counterclockwise directions at the speed of 45 to 60 rpm. In addition, during the rinsing step time, the washing machine 300 may repeatedly perform processes of rotating the drum 330 for approximately 20 seconds (ON time) in the clockwise direction and then stopping the drum 330 for 4 to 5 seconds (OFF time), and rotating the drum 330 for approximately 20 seconds (ON time) in the counterclockwise direction and then stopping the drum 330 for 4 to 5 seconds (OFF time).

In operation 1350, when the rinsing step time has elapsed, the washing machine 300 performs a drainage operation and an intermediate spin-drying operation.

Specifically, the washing machine 300 activates the water circulation pump 362 so that water accommodated in the tub 320 is discharged to the outside of the washing machine 300, and rotates the drum 330 at a high speed so that the laundry and water are separated from each other by a centrifugal force.

For example, the washing machine 300 may rotate the drum 330 in any one of clockwise and counterclockwise directions at a speed of several hundreds to thousands of rpm. In this manner, water of the laundry is separated from the laundry by the centrifugal force while the drum 330 is being rotated.

In this manner, the washing machine 300 jets water into the drum 330 using the first water supply module 351 in the rinsing water supply operation of the rinsing step 1300, thereby improving a rinsing efficiency.

The spin-drying step 1400 is performed in such a manner that the washing machine 300 rotates the drum 330 in any one of clockwise and counterclockwise directions at a speed of several hundreds to thousands of rpm. In this manner, water of the laundry is separated from the laundry by the centrifugal force while the drum 330 is rotated at the speed of several hundreds to thousands of rpm.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A washing machine comprising:
   a drum that is rotatably provided inside a tub;
   a water supply unit configured to supply water into the drum;
   an input unit configured to receive a selection of one of an automatic detergent supply through an automatic detergent supply unit or a direct detergent supply through a detergent container, the detergent container provided separately from the washing machine, positioned in the drum by a user and configured to directly feed a detergent into the drum; and
   a control unit,
   wherein, based on whether the automatic detergent supply through the automatic detergent supply unit is selected, the control unit is configured to repeatedly:
      rotate the drum at a first speed for a first time during supplying the water, and
      stop the drum, and
   wherein, based on whether the direct detergent supply through the detergent container is selected, the control unit is configured to
   repeatedly:
      rotate the drum at a second speed, which is less than the first speed, for a second time, which is less than the first time, during supplying the water, and
      stop the drum.

2. The washing machine according to claim 1, wherein, when the direct detergent supply through the detergent container is selected, a user interface is configured to display a detergent container feeding message.

3. The washing machine according to claim 1, wherein the control unit is configured to:
   control the water supply unit to supply water to the drum until a water level of the water reaches a water level for detergent dissolution, and
   control the water supply unit to supply water until the water level of the water reaches a water level for a washing step.

4. The washing machine according to claim 3, wherein, when the water level of the water reaches the water level for the washing step, the control unit is configured to stop the supply of the water.

5. The washing machine according to claim 1, wherein the control unit is configured to control the water supply unit to supply water into the drum until a water level of the water reaches a water level for a rinsing step.

6. The washing machine according to claim 1, further comprising:
   a display configured to display a washing setting screen that receives a washing setting and an additional setting screen that receives an indication of whether the detergent is automatically supplied.

7. The washing machine according to claim 6, wherein the display is configured to display the additional setting screen in an overlapped position on the washing setting screen.

8. The washing machine according to claim 1, wherein:
   the water supply unit includes a first water supply unit to directly supply water into the drum, and
   the first water supply unit includes a jet nozzle configured to supply water from an upper side of an inlet of the drum toward the inside of the drum.

9. The washing machine according to claim 8, wherein the jet nozzle is configured to obliquely supply water toward a side surface of the drum.

10. The washing machine according to claim 8, wherein the first water supply unit further includes:
    a first water supply pipe configured to guide water from an external water supply source to the jet nozzle, and
    a first water supply valve configured to open and close the first water supply pipe.

11. The washing machine according to claim 1, wherein:
    the water supply unit includes a second water supply unit to supply water to the tub via the automatic detergent supply unit, and the second water supply unit includes a connection pipe that is provided on one side of the tub to guide water to the tub.

12. The washing machine according to claim 11, wherein the second water supply unit further includes:
- a second water supply pipe configured to guide water from an external water supply source to the connection pipe, and
- a second water supply valve configured to open and close the second water supply pipe.

* * * * *